(12) United States Patent
Molla et al.

(10) Patent No.: US 12,058,031 B2
(45) Date of Patent: Aug. 6, 2024

(54) METHODS AND APPARATUSES FOR PROXYING A MULTI-PATH PROTOCOL CONNECTION

(71) Applicant: Telefonaktiebolaget LM Ericsson (publ), Stockholm (SE)

(72) Inventors: Marc Molla, Madrid (ES); Juan Arribas Ferrero, Villanueva del Pardillo (ES); Sergio Arroutbi Braojos, Fuenlabrada-Madrid (ES); Jose Antonio Garvayo De Lara, Pedrezuela (ES); Carlos Martin Garcia, Avila (ES); Juan Antonio Gimenez Segura, San Sebastian de los Reyes (ES); Celestino Martinez Lopez, Murcia (ES); Rodrigo Alvarez Dominguez, Madrid (ES); Daniel Torres Gonzalez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 39 days.

(21) Appl. No.: 16/971,555

(22) PCT Filed: Mar. 15, 2018

(86) PCT No.: PCT/EP2018/056557
§ 371 (c)(1),
(2) Date: Aug. 20, 2020

(87) PCT Pub. No.: WO2019/161937
PCT Pub. Date: Aug. 29, 2019

(65) Prior Publication Data
US 2020/0396155 A1 Dec. 17, 2020

(30) Foreign Application Priority Data

Feb. 22, 2018 (EP) .................................. 18382105

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4641* (2013.01); *H04L 67/56* (2022.05);
(Continued)

(58) Field of Classification Search
CPC ..... H04L 45/24; H04L 12/4641; H04L 67/28; H04L 69/14; H04L 12/66; H04W 88/16
See application file for complete search history.

(56) References Cited

U.S. PATENT DOCUMENTS

2012/0188949 A1 7/2012 Salkintzis et al.
2015/0319270 A1\* 11/2015 Roeland ................. H04L 69/14
370/254
(Continued)

FOREIGN PATENT DOCUMENTS

CN 104769910 A 7/2015
CN 104854837 A 8/2015
(Continued)

OTHER PUBLICATIONS

International Search Report dated Sep. 25, 2018 for International Application PCT/EP2018/056557 filed on Mar. 15, 2018; consisting of 11-pages.
(Continued)

*Primary Examiner* — Harry H Kim
*Assistant Examiner* — Mohammed M Murshid
(74) *Attorney, Agent, or Firm* — Weisberg I.P. Law, P.A.

(57) ABSTRACT

Methods and apparatuses are disclosed for communicating a hybrid user equipment with an Internet server, whereby a hybrid access gateway receives a multi-path request from a user plane system, transmits the multipath request toward an
(Continued)

Internet server, and receives a corresponding response from the Internet server. If the received response is a single-path response, the hybrid access gateway assumes the Internet server does not support multi-path, activates a proxy function for the session and transmits a multi-path response for the received single-path response toward the user plane system, and the latter marks transmitting further multi-path requests for this session toward the hybrid access gateway. If the received response is a multi-path response, the hybrid access gateway assumes the Internet server supports multi-path, deactivates a proxy function for the session and transmits the received multi-path response toward the user plane system, and the latter marks bypassing the hybrid access gateway for further multi-path requests for this session.

18 Claims, 16 Drawing Sheets

(51) Int. Cl.
*H04L 12/66* (2006.01)
*H04L 67/56* (2022.01)
*H04L 69/14* (2022.01)
*H04W 88/16* (2009.01)

(52) U.S. Cl.
CPC ............. *H04L 69/14* (2013.01); *H04L 12/66* (2013.01); *H04W 88/16* (2013.01)

(56) References Cited

U.S. PATENT DOCUMENTS

| | | | | |
|---|---|---|---|---|
| 2016/0183129 | A1* | 6/2016 | Liu | H04W 76/15 370/331 |
| 2016/0337235 | A1* | 11/2016 | Guichard | H04L 12/4633 |
| 2016/0365989 | A1* | 12/2016 | Herrero | H04L 65/4015 |
| 2017/0086111 | A1* | 3/2017 | Vrzic | H04W 36/023 |
| 2017/0104609 | A1* | 4/2017 | Mcnamee | H04W 4/24 |
| 2017/0134186 | A1* | 5/2017 | Mukundan | H04L 47/41 |
| 2017/0142231 | A1* | 5/2017 | Boucadair | H04L 69/16 |
| 2017/0222917 | A1* | 8/2017 | Reddy | H04L 45/74 |
| 2017/0289047 | A1* | 10/2017 | Szilágyi | H04L 41/5067 |
| 2017/0317920 | A1* | 11/2017 | Rocquelay | H04L 45/24 |
| 2018/0062979 | A1* | 3/2018 | Zee | H04L 45/245 |
| 2018/0091323 | A1* | 3/2018 | Haag | H04L 12/5691 |
| 2018/0199243 | A1* | 7/2018 | Bharatia | H04W 76/34 |
| 2018/0351852 | A1* | 12/2018 | Boucadair | H04L 45/12 |
| 2018/0368047 | A1* | 12/2018 | Patil | H04L 45/245 |
| 2019/0089623 | A1* | 3/2019 | Dion | H04N 21/6118 |
| 2019/0182363 | A1* | 6/2019 | Bonaventure | H04L 67/01 |
| 2019/0363974 | A1* | 11/2019 | Wang | H04L 67/141 |
| 2020/0186490 | A1* | 6/2020 | Bhaskaran | H04L 61/58 |
| 2020/0367306 | A1* | 11/2020 | Wang | H04L 63/0884 |
| 2021/0014153 | A1* | 1/2021 | Amend | H04L 69/14 |

FOREIGN PATENT DOCUMENTS

| | | | | |
|---|---|---|---|---|
| CN | 106716950 A | | 5/2017 | |
| SE | WO 2016144224 | * | 2/2015 | ............ H04W 84/04 |
| SE | WO2016/144224 | * | 3/2015 | ............ H04L 29/06 |
| WO | 2014068062 A1 | | 5/2014 | |
| WO | 2016144224 A1 | | 9/2016 | |
| WO | 2017003065 A1 | | 1/2017 | |

OTHER PUBLICATIONS

From Interworking to Hybrid Access Systems and the Road Toward the Next-Generation of Fixed-Mobile Convergence; Samdanis Konstantinos et al; Communications Standards; Mar. 1, 2017; pp. 36-43; vol. 1, No. 1; consisting of 8-pages.
Hybrid Access Broadband Network Architecture TR-348; Broadband Forum Technical Report; Jul. 2016; Issue 1; consisting of 49-pages.
Joel Halpern et al; Service Function Chaining (SFC) Architecture; Oct. 2015; Internet Engineering Task Force (IETF); Request for Comments: 7665; Category—consisting of 32-pages.
ETSI GS NFV 002 V1.1.1: Group Specification: Network Functions Virtualisation (NFV); Architectural Framework; Oct. 2013; ETSI, France; consisting of 21-pages.
Chinese Office Action with English Machine Translation dated Apr. 1, 2022 for Patent Application No. 201880092623.2, consisting of 27-pages.
EPO Communication dated Feb. 8, 2024 for Patent Application No. 18710483.1, consisting of 6 pages.

* cited by examiner

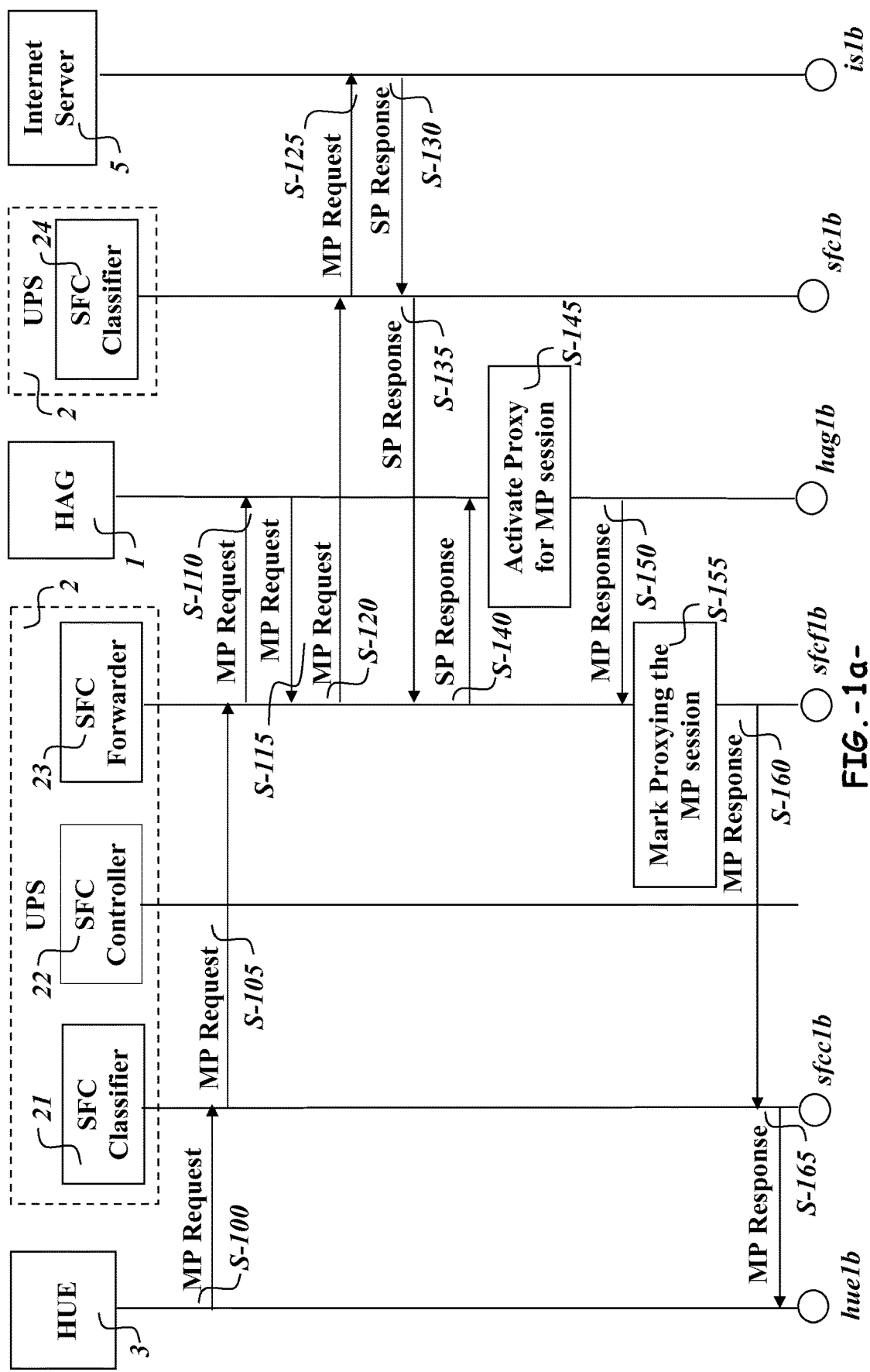

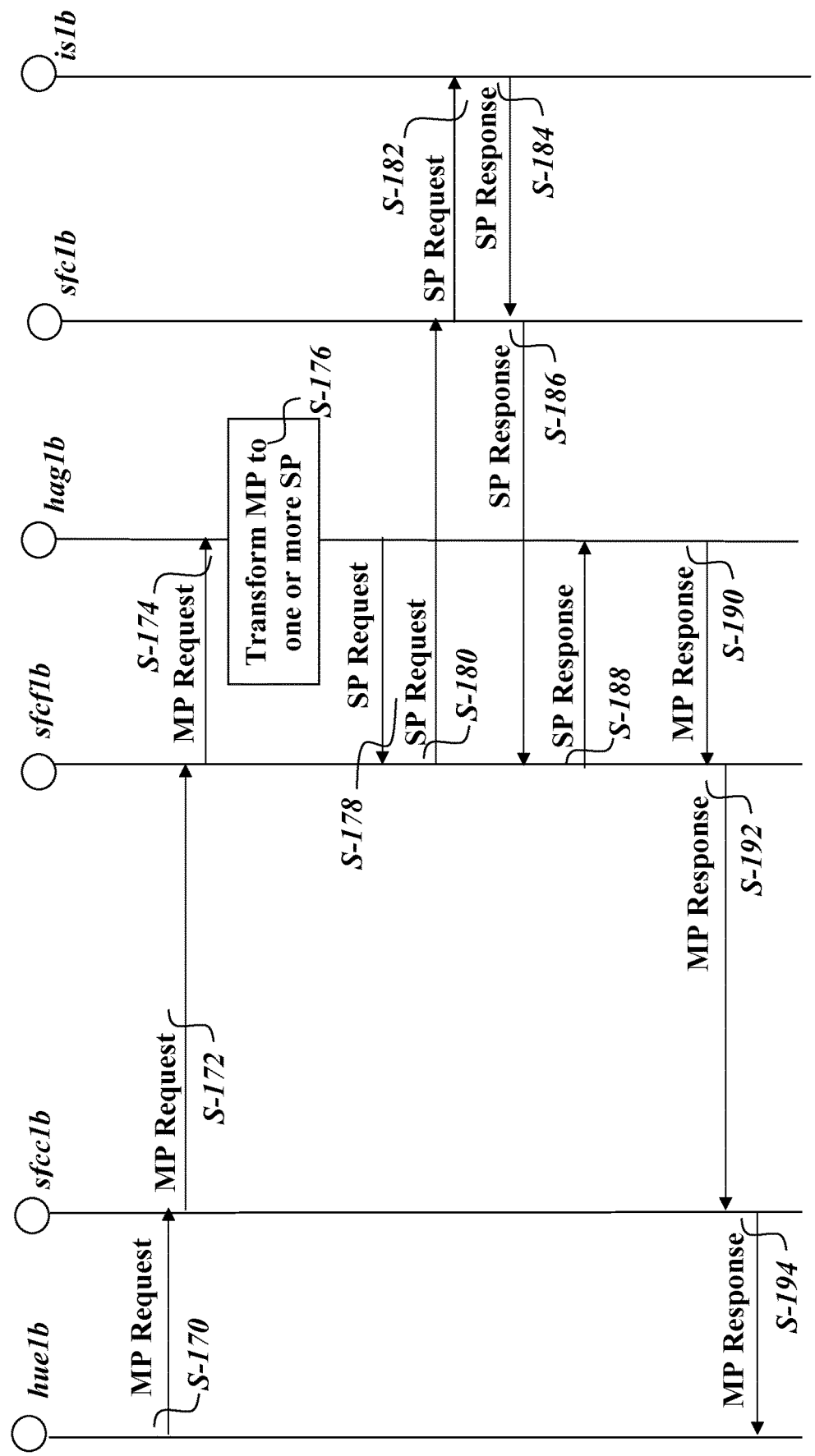
FIG.-1b-

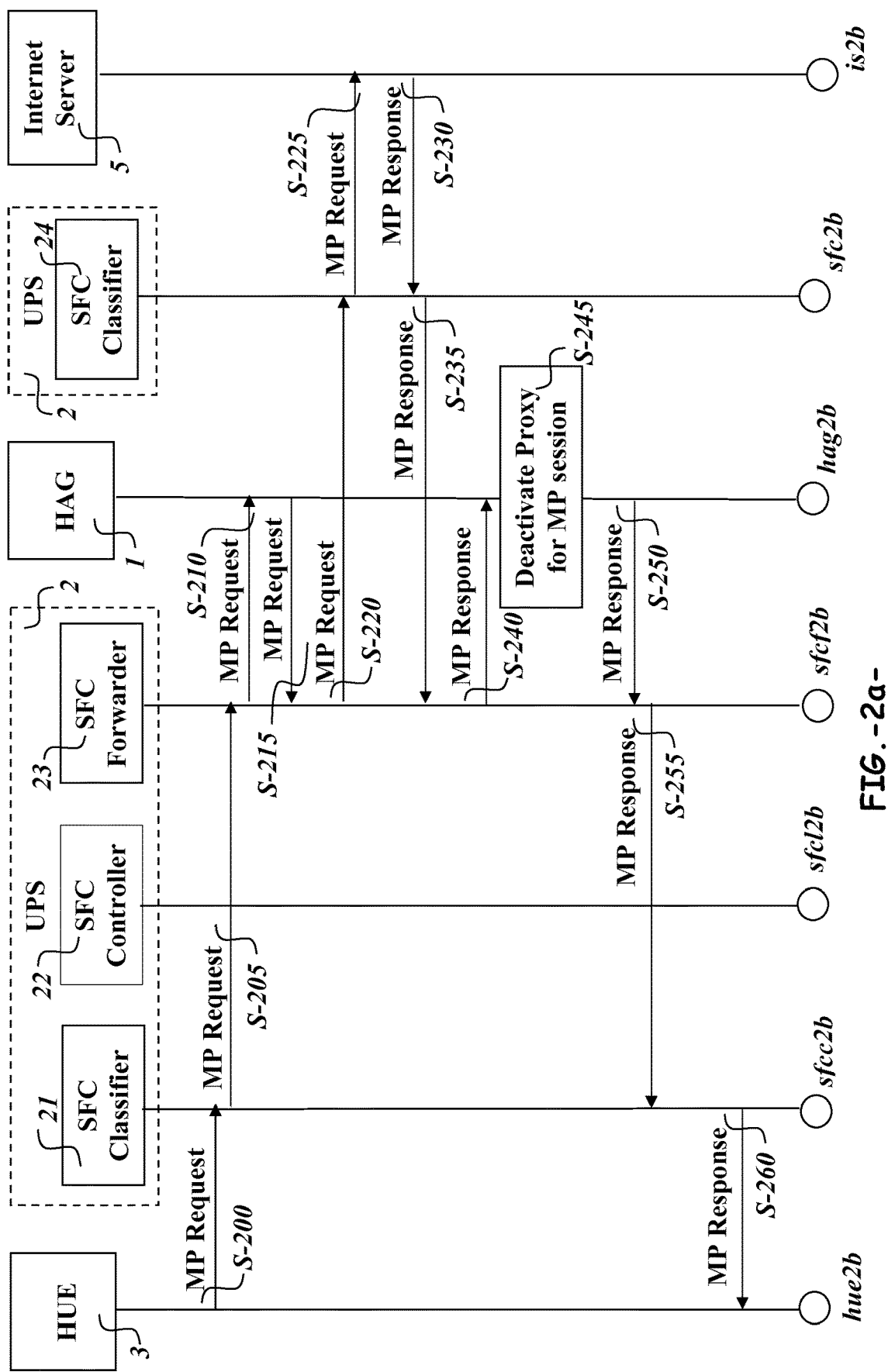
FIG.-2a-

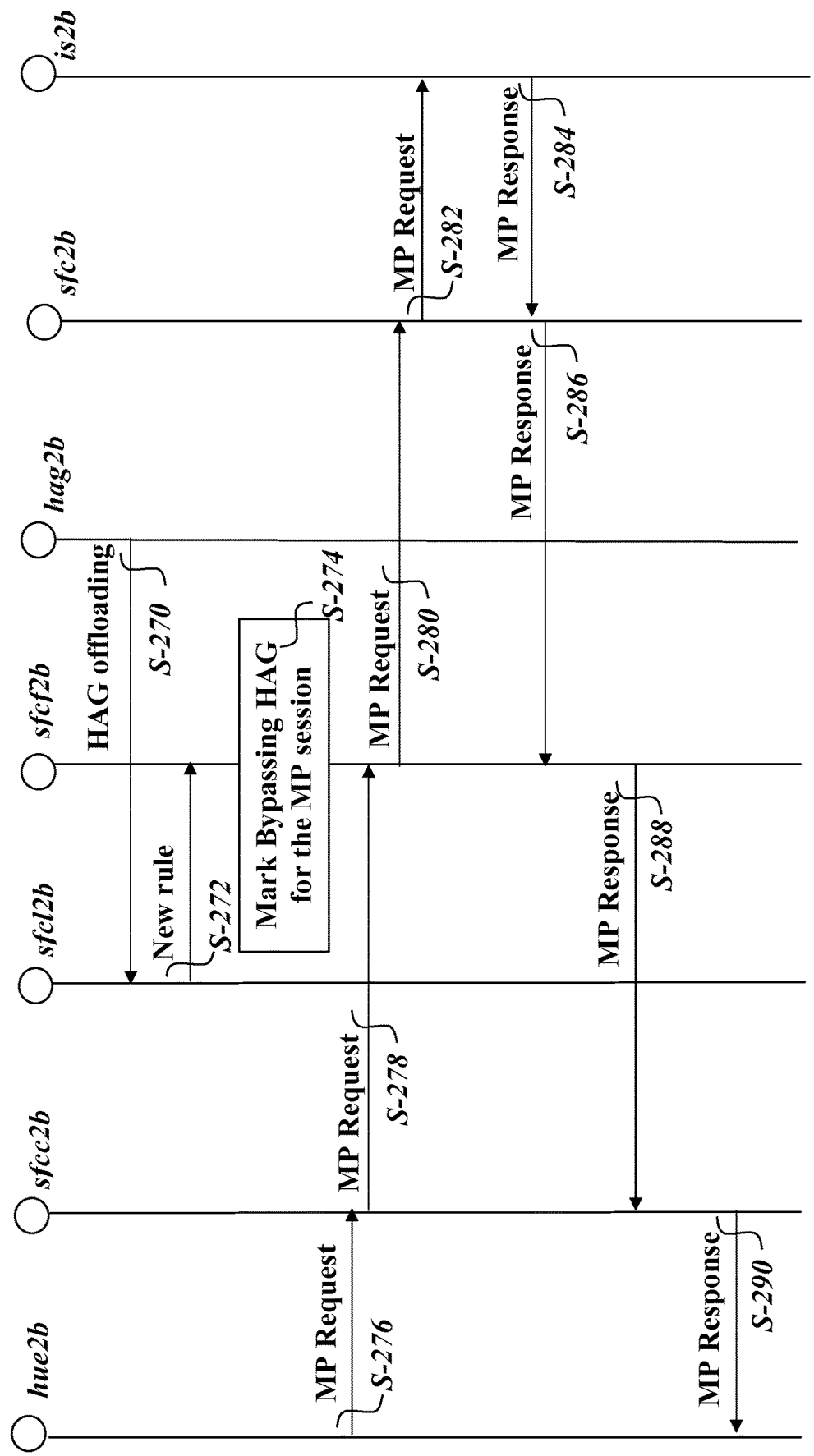
FIG. -2b-

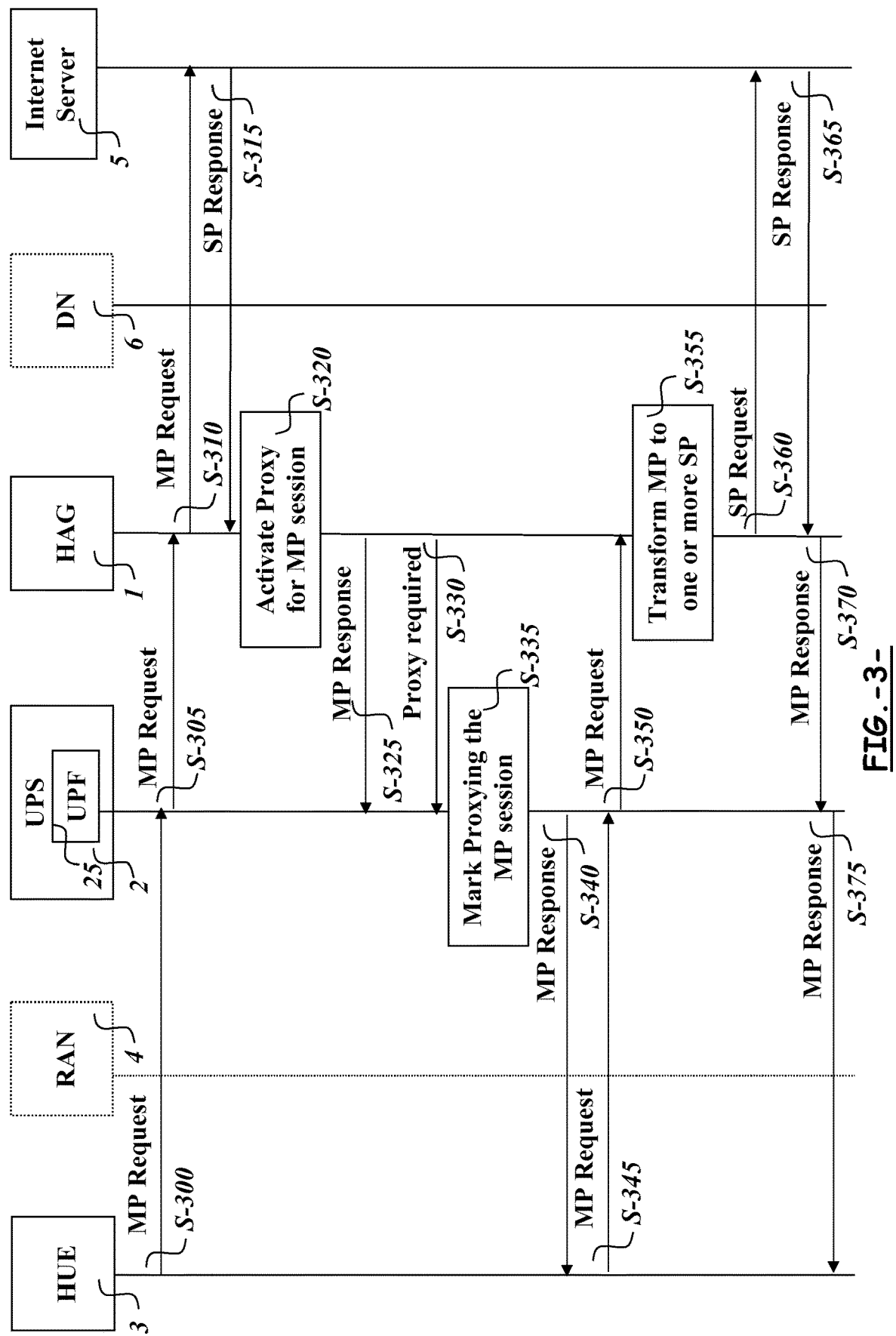
FIG. -3-

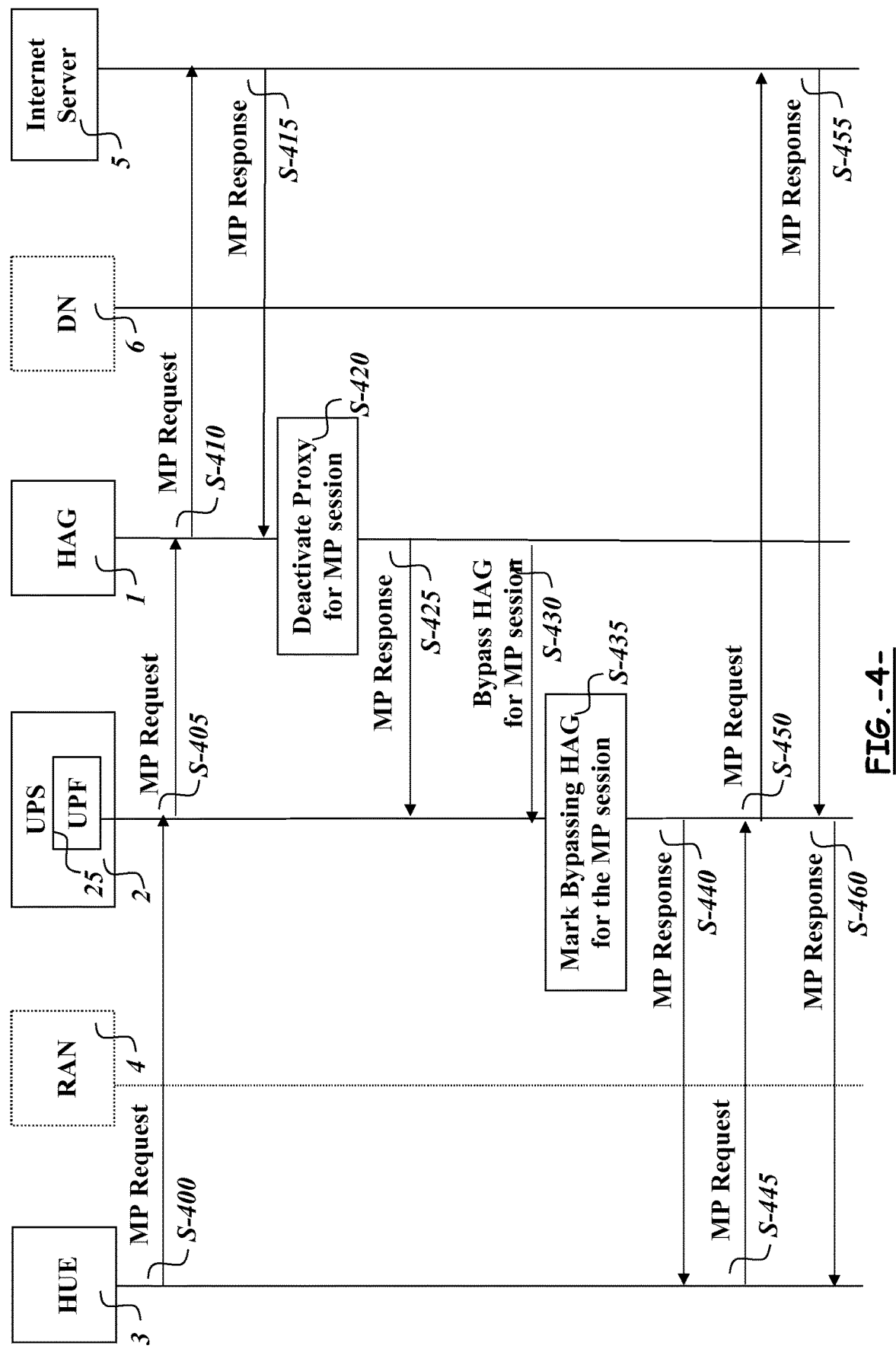
FIG.-4-

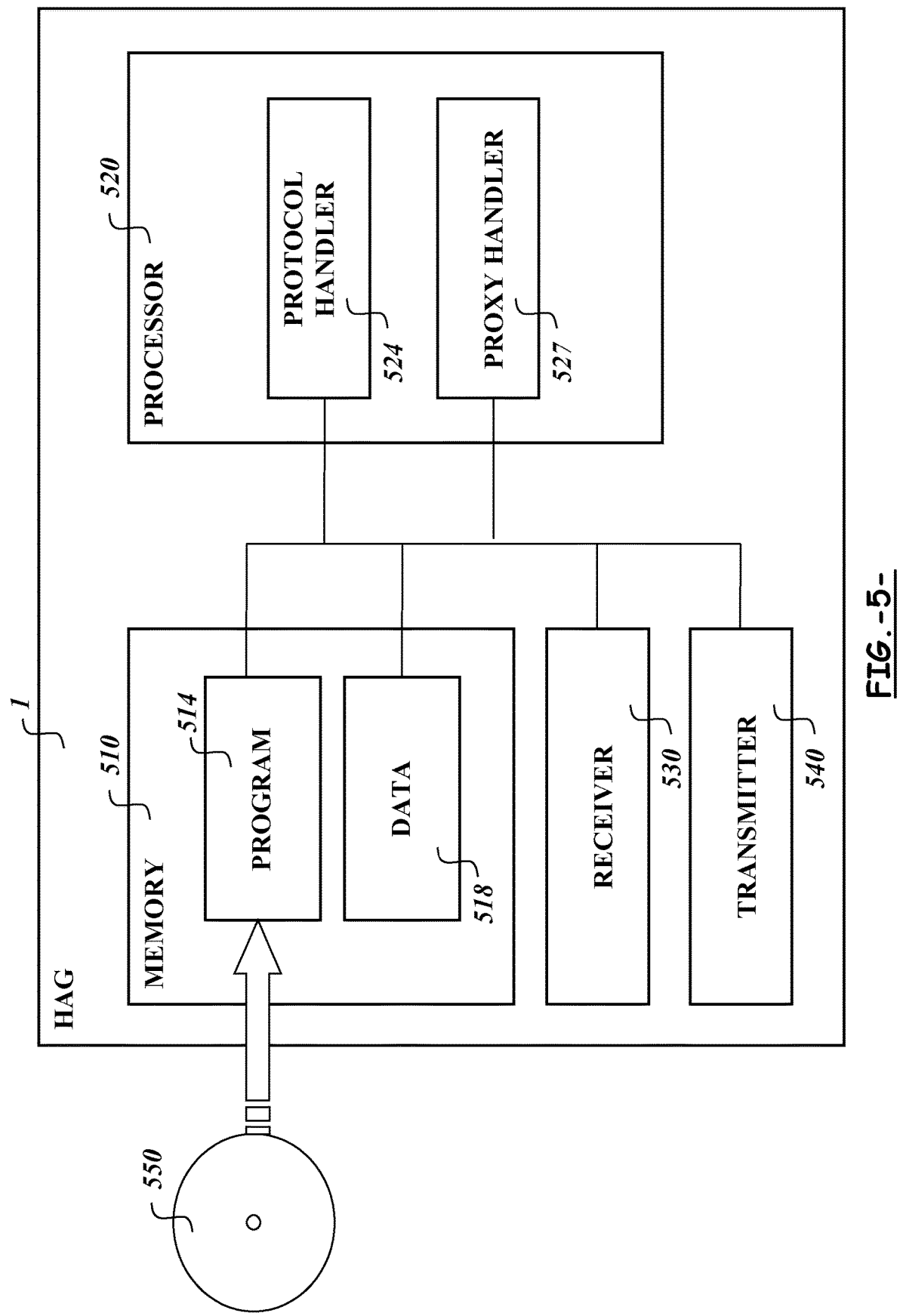
FIG. -5-

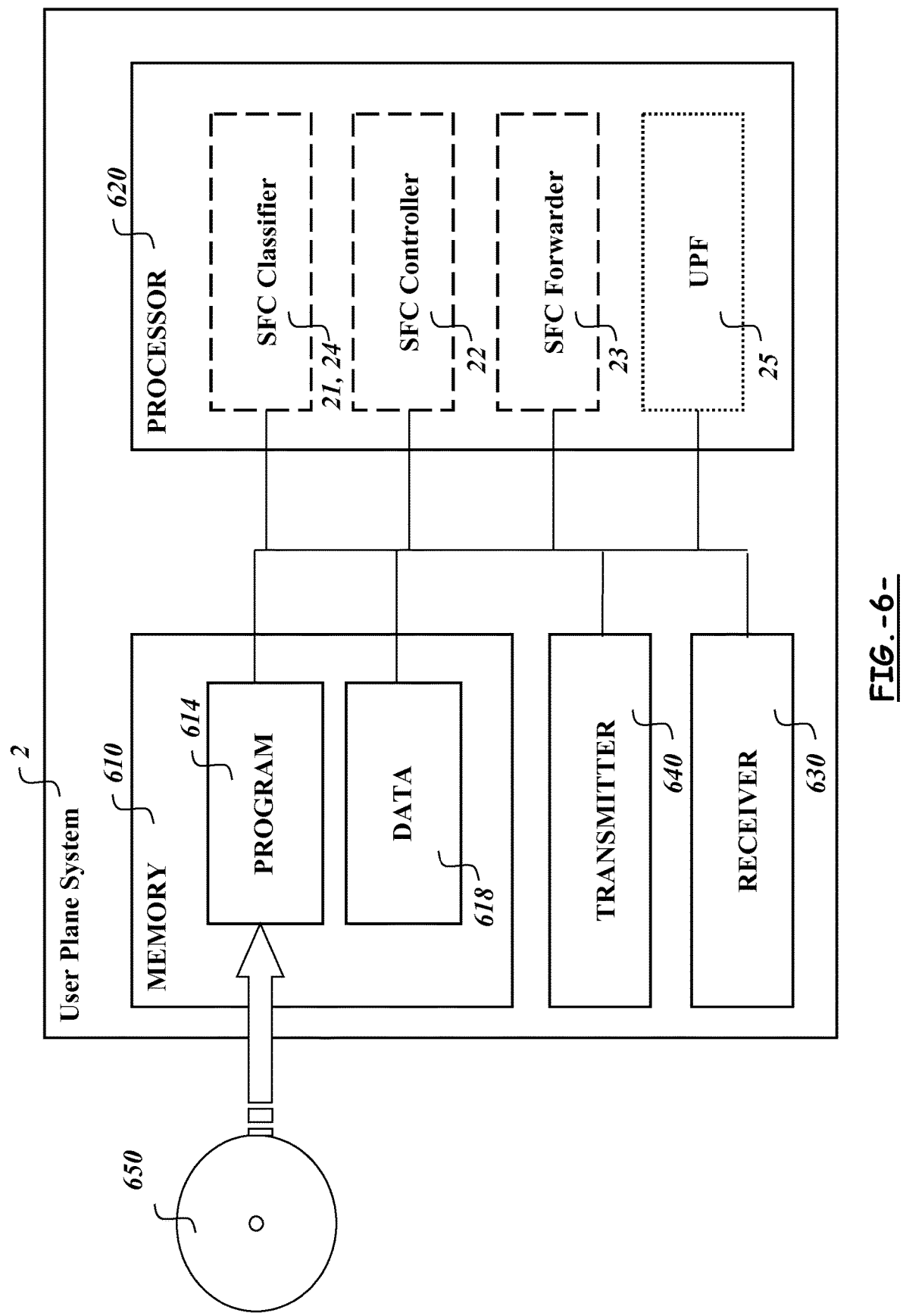
FIG. -6-

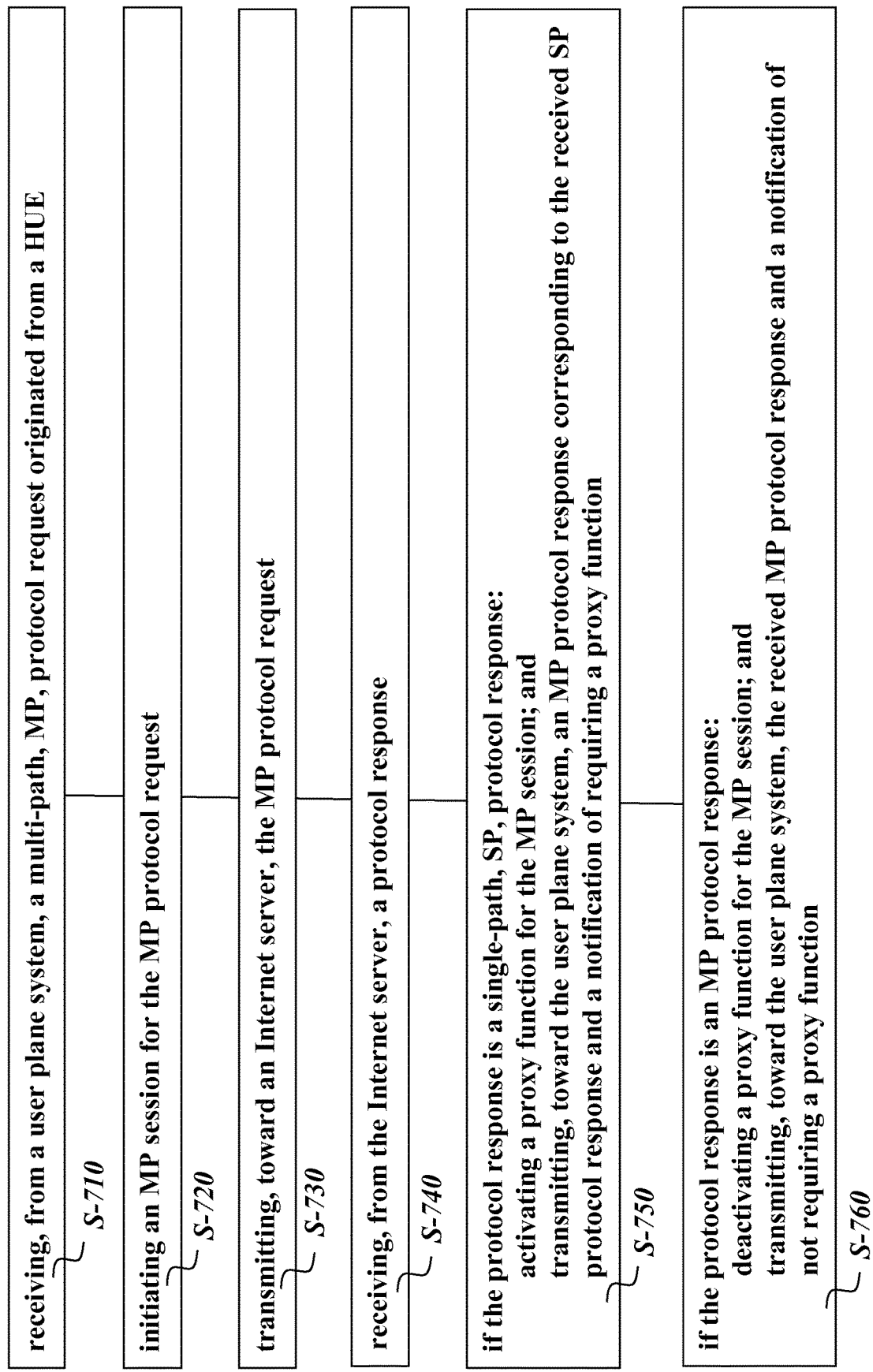
FIG.-7-

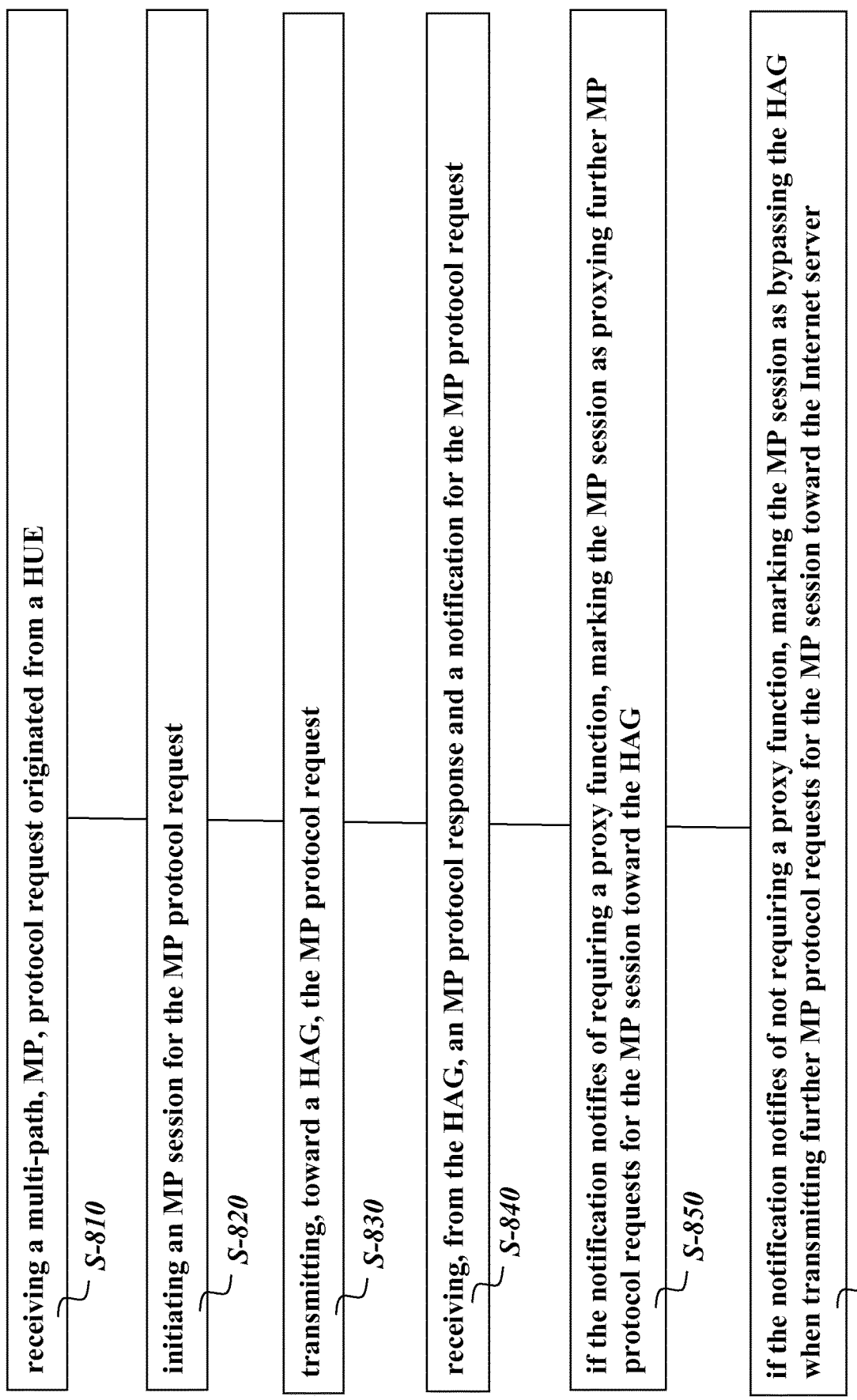
FIG. -8-

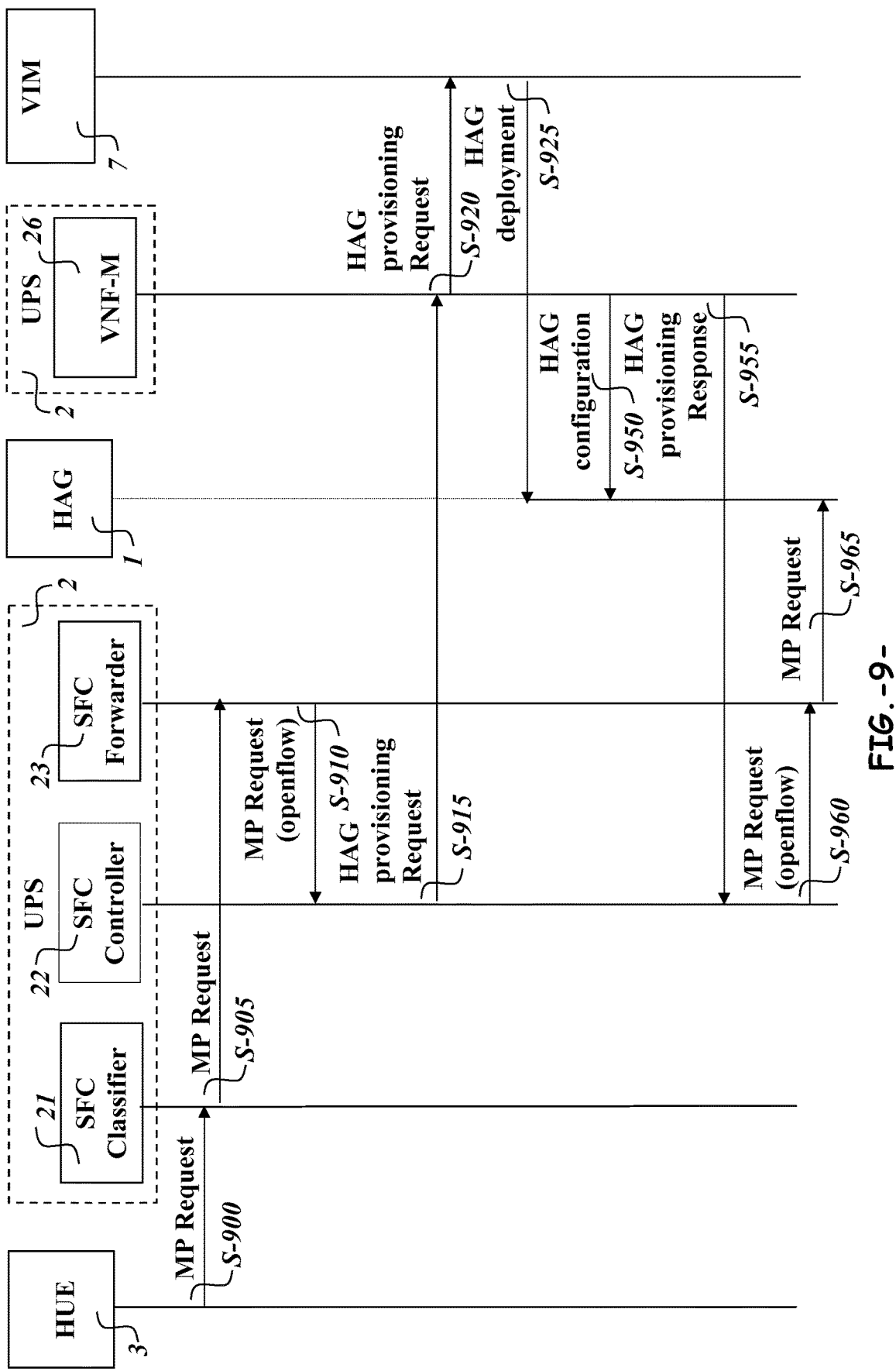
FIG.-9-

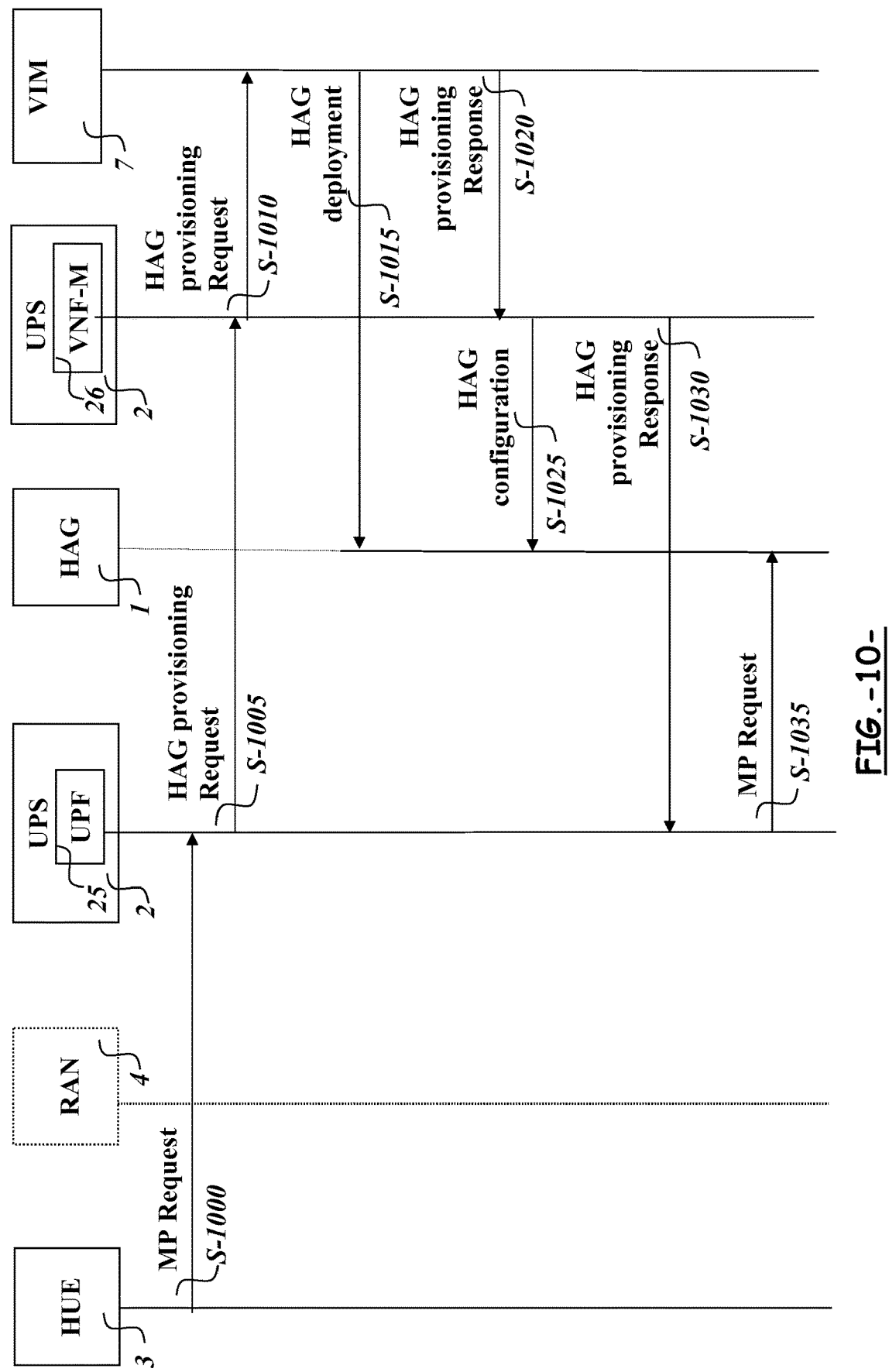
FIG. -10-

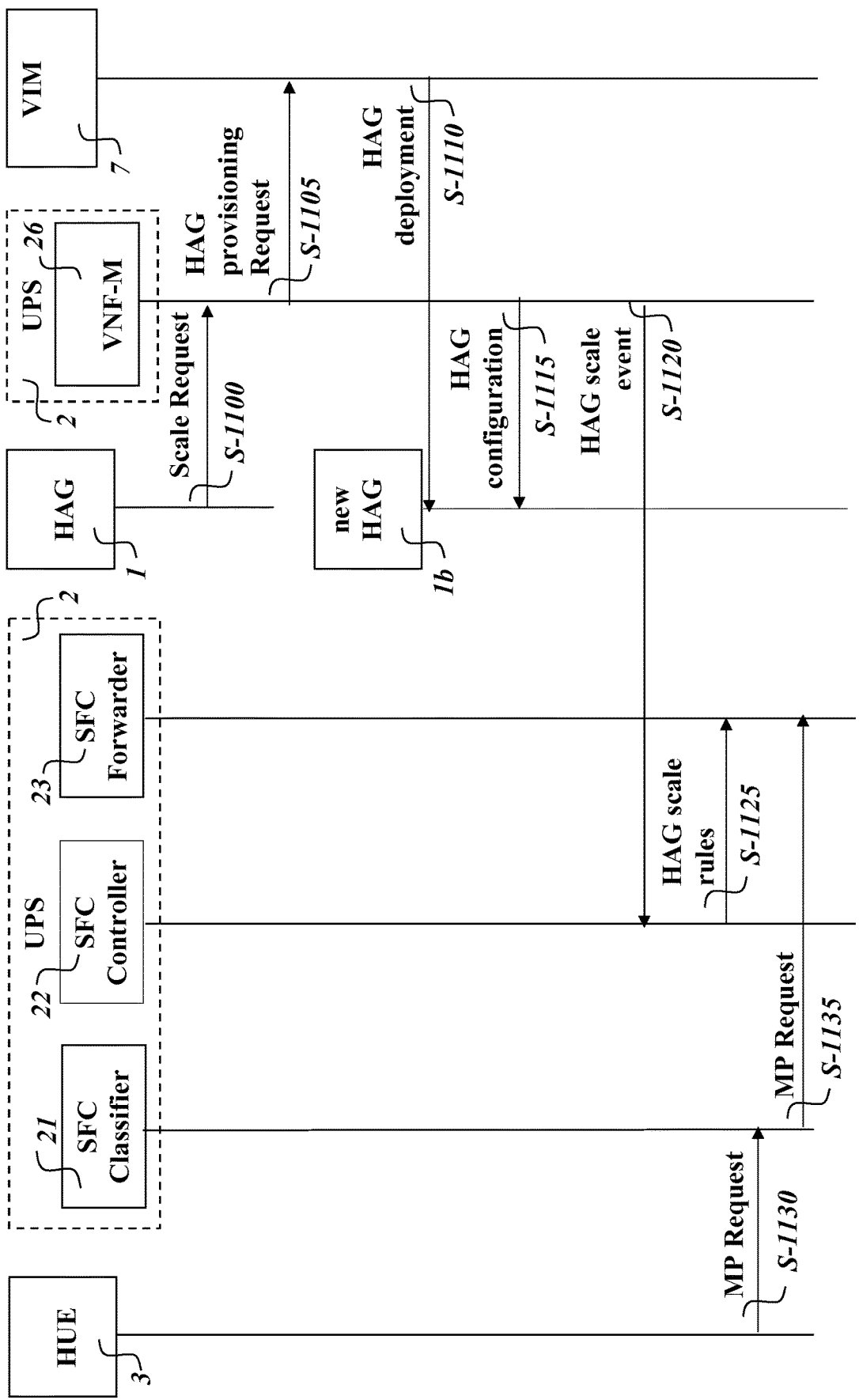
FIG.-11-

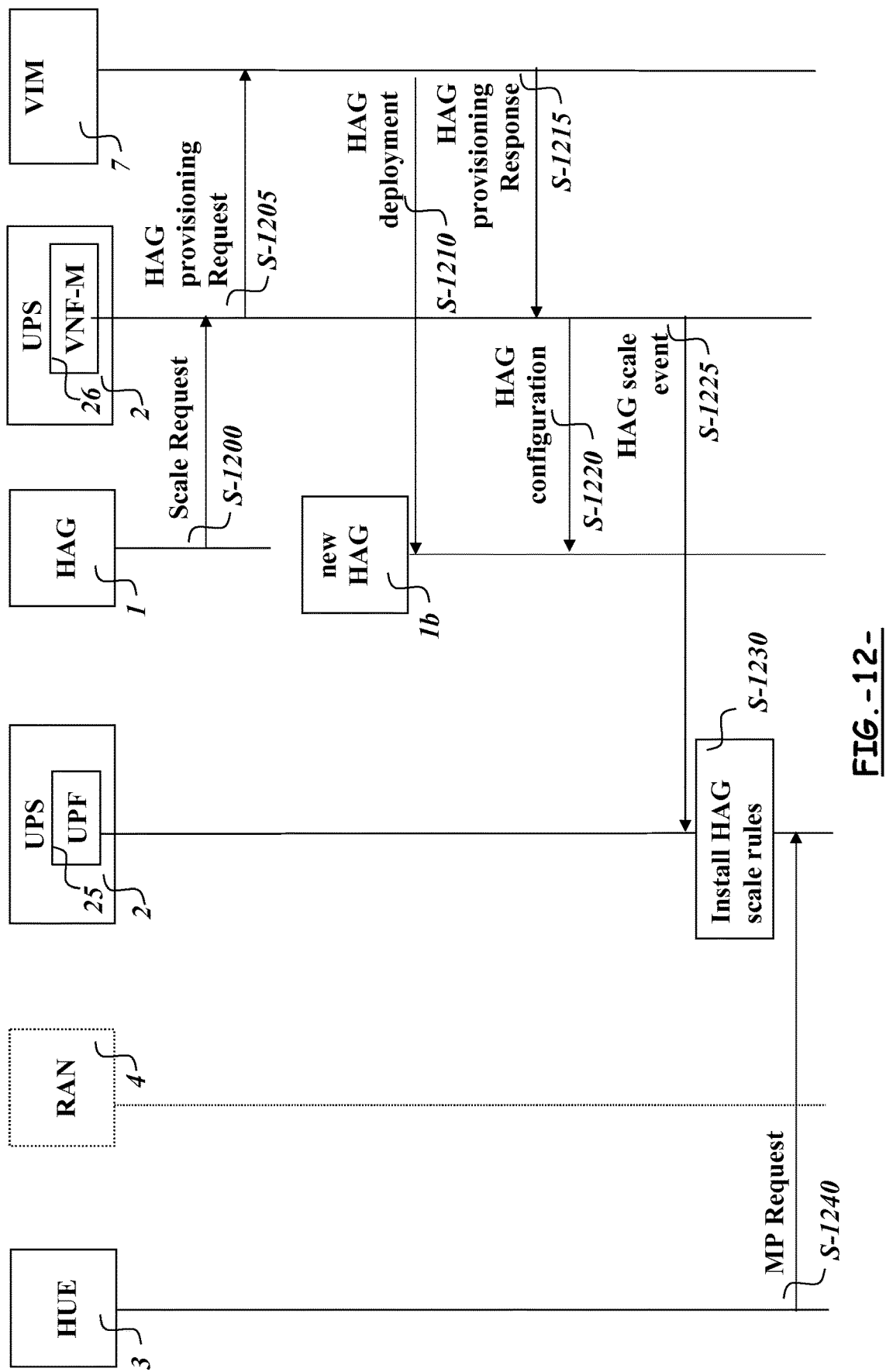
FIG. -12-

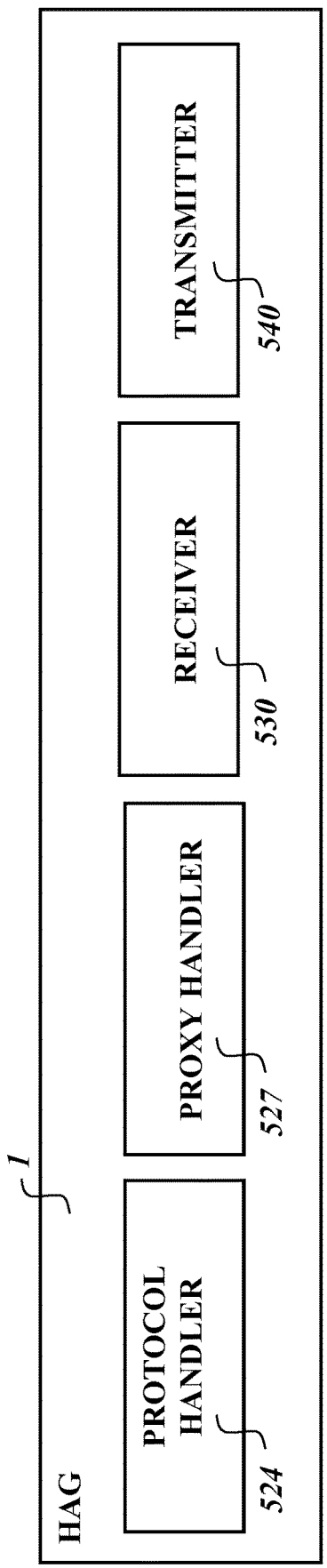
FIG. -13-
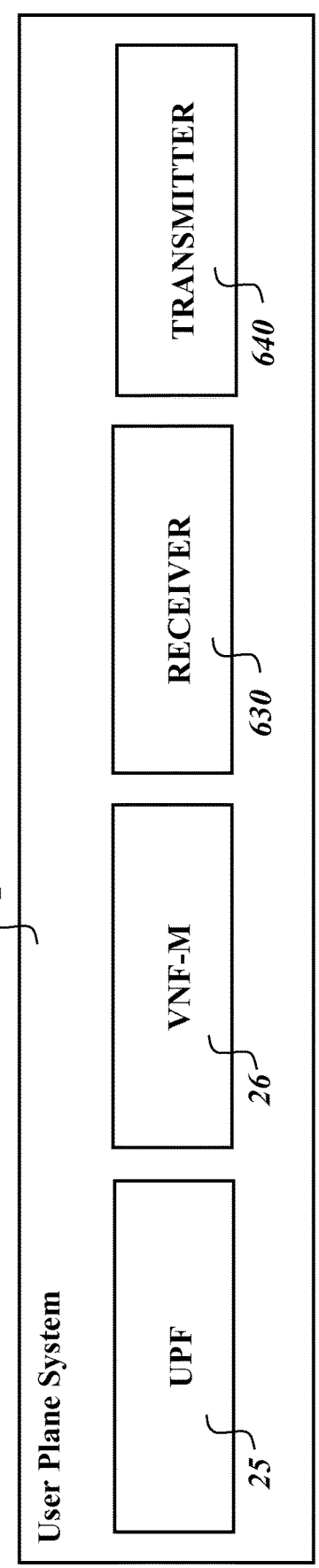
FIG. -14-

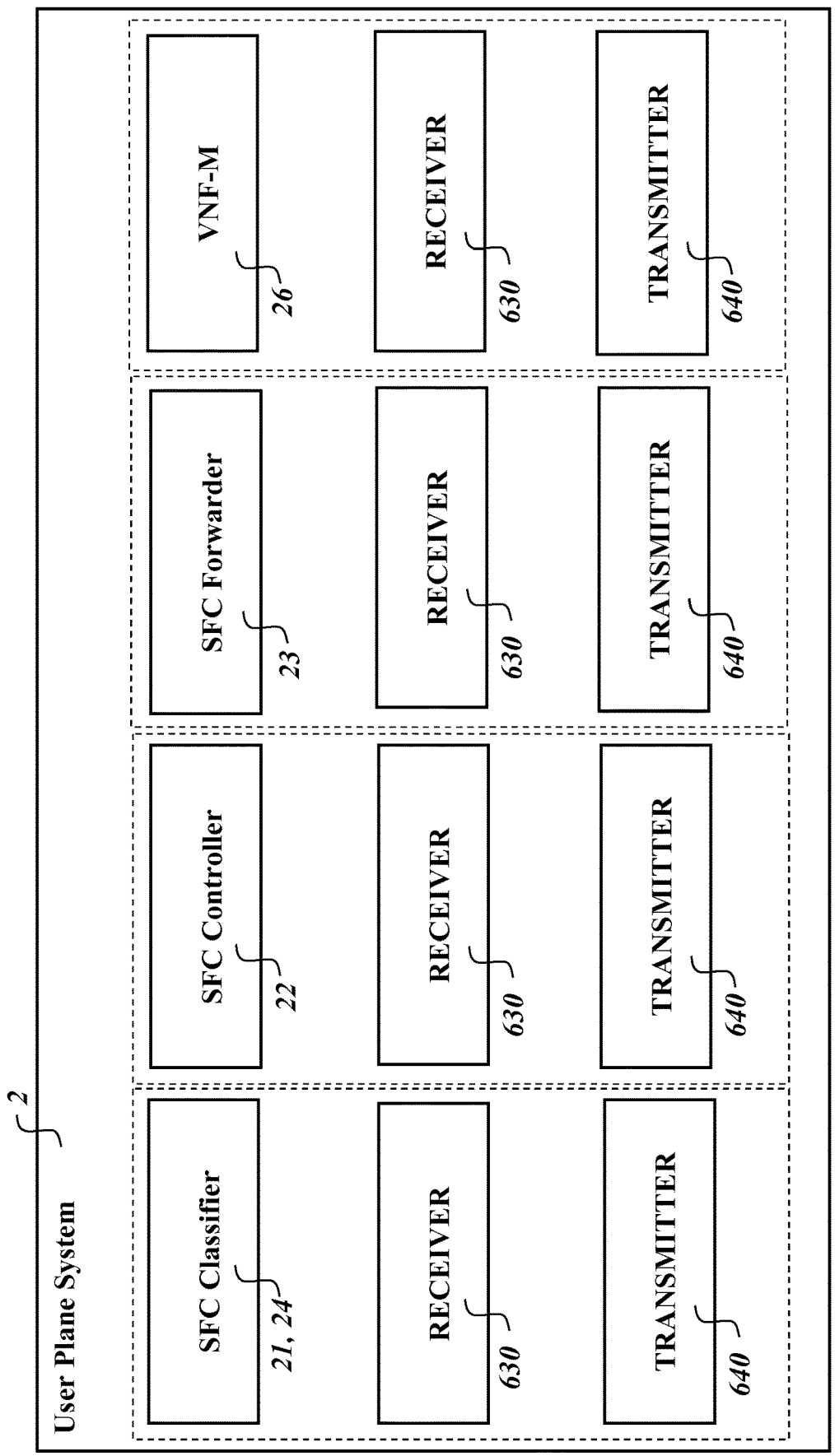
FIG. -15-

METHODS AND APPARATUSES FOR PROXYING A MULTI-PATH PROTOCOL CONNECTION

CROSS-REFERENCE TO RELATED APPLICATIONS

This application is a Submission Under 35 U.S.C. § 371 for U.S. National Stage Patent Application of International Application No. PCT/EP2018/056557, filed Mar. 15, 2018 entitled "METHODS AND APPARATUSES FOR PROXYING A MULTI-PATH PROTOCOL CONNECTION," which claims priority to application Ser. No. 18/382,105.7, filed Feb. 22, 2018, the entireties of both of which are incorporated herein by reference.

TECHNICAL FIELD

The present invention generally relates to optimizing the usage of network resources; and, more specifically, the invention relates to accommodating network resources when both endpoints do not support a multipath technology.

BACKGROUND

Hybrid Access technology allows a combined usage of fixed broadband and 3GPP access networks. TR-348 Hybrid Access Broadband Network Architecture specifies the architectural requirements to a simultaneous use of fixed broadband access and 3GPP access networks, and enables further Fixed-Mobile Convergence (FMC) use cases. TR-348 discloses the transport of traffic between Hybrid Customer Premises Equipment (HCPE) and a Hybrid Access Gateway (HAG) in Hybrid Access broadband networks. There are several solutions that may be used to transport traffic between the HCPE (Hybrid Customer Premises Equipment) and HAG (Hybrid Access Gateway) in Hybrid Access broadband networks. The main objective is faster service turn-up for new subscribers, increased access reliability and enabling higher throughput for subscribers The connectivity between HCPE and HAG may be established by using a Layer 4 (L4) multipath transport service. For example, L4 multipath may be implemented with Multi-Path (MP) Transport Control Protocol (TCP), hereinafter referred to as MP-TCP, by setting up multiple TCP-sub-flows over different access networks.

On the other hand, Service Function Chaining (SFC) allows steering packets which flow through a packet network so that packets fulfilling certain criteria traverse a sequence of service functions (SF) in its way to its destination. An SFC controller is responsible for managing the data plane connectivity for a set of hosts. An SFC classifier is an SFC element that performs classification. An SFC forwarder is responsible for forwarding traffic to one or more connected SF. SFC is an IETF standard, mainly specified in RFC 7665. Multiple implementations exist.

Currently, the Hybrid Access is being deployed in the Packet Core Network. However, most of the current Internet servers do not support multipath and cannot take advantage of the multipath technology. A Hybrid Access Proxy, such as a HAG may behave, may solve this problem but impacts on the operators' CAPEX/OPEX. In this respect, 5G networks are promising a high access throughput and this fact will have a great impact on Proxy servers since they must handle a high rate traffic.

In Network Function Virtualization (NFV) scenarios, multipath is not considered a key factor to consider when a scaling operation is done and, since the HAG is a stateful Virtual Network Function (VNF), all flows of a same MP-TCP session should be handled by the same HAG. In these scenarios, an automatic scale-out, without human intervention, is not possible.

3GPP TS 23.501 V1.4.0 discloses a User Plane Function (UPF) as part of the 3GPP 5G network architecture. The UPF does not take into consideration the steering problems that an SF, like a stateful HAG, raises. This can raise an issue when each access of a same customer is handled by different instances of HAG, what ends in the impossibility of doing the proxy.

Eventually, endpoints such as the HCPE and the Internet server in the MP-TCP protocol are responsible of the packet steering, i.e. they decide which access is used for each packet of the MP-TCP session. These decisions are based on technical characteristics of the accesses and may not follow the Operators' policies.

The inventors have recognized there is a need of optimizing network resources and of using the HAG only in scenarios that the operators decide, so that cheapest access is selected even if it is not the best one.

SUMMARY

The present invention is aimed to at least minimize the above drawbacks and provides for apparatuses and methods for communicating a hybrid user equipment, HUE, with an Internet server through a hybrid access gateway, HAG.

In accordance with a first aspect, there is provided a new method for communicating a HUE with an Internet server through a HAG, wherein the HAG is enabled to determine whether the HUE accesses through a mobile or a fixed access network.

This method is executed at the HAG and comprises: receiving, from a user plane system, a multi-path, hereinafter MP, protocol request originated from a HUE; initiating an MP session for the MP protocol request; transmitting, toward an Internet server, the MP protocol request; and receiving, from the Internet server, a protocol response for the MP protocol request.

In this method, if the protocol response is a single-path, hereinafter SP, protocol response, the method further comprises: activating a proxy function for the MP session; and transmitting, toward the user plane system, an MP protocol response corresponding to the received SP protocol response and a notification of requiring a proxy function. In this respect, the HAG may assume that the Internet server does not support MP protocol requests, and the HAG thus notifies the user plane system of requiring the HAG as a proxy toward the Internet server.

In this method, if the protocol response is an MP protocol response, the method further comprises: deactivating a proxy function for the MP session; and transmitting, toward the user plane system, the received MP protocol response and a notification of not requiring a proxy function. In this respect, the HAG may assume that the Internet server supports MP protocol requests, and the HAG thus notifies the user plane system of not requiring the HAG as a proxy toward the Internet server.

With these two possible protocol responses and corresponding assumptions, the HAG would only be involved in further MP protocol requests for the same MP session if the Internet server does not support MP protocol requests. In other words, if a further MP protocol request for the same MP session is received, the HAG should take actions to facilitate the communication with the Internet server.

To this end, this method may further comprise: receiving, at the HAG from the user plane system, a further MP protocol request originated from the HUE for the same MP session; transforming the further MP protocol request into one or more SP protocol requests; and transmitting, toward the Internet server, the one or more SP protocol requests.

Nevertheless, in an alternative embodiment, even if the Internet server supports MP requests, the HAG is kept in the flow sequence so that the HAG may receive a downlink MP request from the Internet server. The HAG may check a configured network operator policy and decide if the downlink MP request addresses the destination through the right access network. In case the network operator policy steering result is different, the HAG may transmit the downlink MP request toward the HUE through a different access network.

In an embodiment, the user plane system may be implemented with a Service Function Chaining, SFC, infrastructure. In this embodiment, at least one of the MP protocol request and the protocol response may be received at the HAG from an SFC forwarder of the user plane system. Also, in this embodiment, at least one of the MP protocol request and the MP protocol response may be transmitted from the HAG toward the SFC forwarder of the user plane system.

In another embodiment, the user plane system may comprise a user plane function, UPF, as defined for e.g. a 5G network. In this another embodiment, the MP protocol request may be received at the HAG from a UPF of the user plane system, and the MP protocol response and notification may be transmitted from the HAG toward the UPF of the user plane system. Also, in this another embodiment, the MP protocol request may be transmitted from the HAG toward the Internet server through a Data Network, DN, and the protocol response may be received at the HAG from the Internet server through the DN.

Irrespective of the above two embodiments of the user plane system, and for the purpose of scaling the HAG without breaking the existing MP sessions, e.g. in case of requiring more HAG resources, this method may further comprise transmitting, from the HAG toward a Virtual Network Function Manager, VNF-M, a request to deploy a new HAG.

In accordance with a second aspect, there is provided a new method for communicating a HUE with an Internet server through a HAG, wherein the HAG is enabled to determine whether the HUE accesses through a mobile or a fixed access network.

This method is executed at a user plane system and comprises: receiving an MP protocol request originated from a HUE; initiating an MP session for the MP protocol request; transmitting, toward a HAG, the MP protocol request; and receiving, from the HAG, an MP protocol response and a notification for the MP protocol request.

In this method, if the notification notifies of requiring a proxy function, the method further comprises: marking the MP session as proxying further MP protocol requests for the MP session toward the HAG.

In this method, if the notification notifies of not requiring a proxy function, the method further comprises: marking the MP session as bypassing the HAG when transmitting further MP protocol requests for the MP session toward the Internet server.

With these two notifications in this method, if a further MP protocol request is received at the user plane system for the same MP session, the user plane system knows if it should transmit the further MP protocol request toward the HAG or if it should bypass the HAG and transmit the further MP protocol request directly toward the Internet server.

To this end, this method may further comprise: receiving a further MP protocol request originated from the HUE for the same MP session; if the MP session is marked as proxying, transmitting the further MP protocol request toward the HAG; and, if the MP session is marked as bypassing the HAG, transmitting the further MP protocol request toward the Internet server.

Nevertheless, in an alternative embodiment, even if the MP session is marked as bypassing the HAG, the HAG might be maintained in communication, so that the HAG may receive a downlink MP request from the Internet server addressing the destination through a particular access network, and the HAG may decide the transmission of the downlink MP request toward the HUE through a different access network.

In an embodiment, the user plane system may be implemented with a Service Function Chaining, SFC, infrastructure. In this embodiment, the user plane system may comprise an SFC forwarder for transmitting the MP protocol request originated from the HUE toward the HAG, and for receiving the MP protocol response and the notification from the HAG.

Also, in this embodiment, the method may further comprise: transmitting, from the SFC forwarder to an SFC controller of the SFC infrastructure, a request to deploy a HAG; transmitting, from the SFC controller toward a Virtual Network Function Manager, VNF-M, a request to deploy the HAG; and receiving, at the SFC controller from the VNF-M, a notification of the HAG deployment.

Further in this embodiment, the method may further comprise: receiving, at the SFC controller from a VNF-M, a notification of a new HAG deployment; and transmitting, from the SFC controller to the SFC forwarder, new rules to maintain existing MP sessions with the HAG, and to distribute new MP sessions between the HAG and the new HAG.

Still further in this embodiment, the method may further comprise: receiving, at an SFC controller, an indication of a new IP address of the HUE to be associated with the MP session; and transmitting, from the SFC controller to the SFC forwarder, new rules to transmit MP protocol requests from the new IP address toward the HAG handling the MP session.

Still further in this embodiment, the user plane system may comprise an SFC classifier for tagging the MP protocol request originated from the HUE, and wherein the MP protocol request transmitted to the HAG, via the SFC forwarder, may be a tagged MP protocol request.

In another embodiment, the user plane system may comprise a user plane function, UPF, as defined for e.g. a 5G network. In this another embodiment, the MP protocol request may be transmitted toward the HAG from a user plane function, UPF, of the user plane system, and the MP protocol response and notification may be received, from the HAG, at the UPF of the user plane system.

Also, in this another embodiment, the method may further comprise: transmitting, from the UPF toward a Virtual Network Function Manager, VNF-M, a request to deploy a HAG; and receiving, at the UPF from the VNF-M, a notification of the HAG deployment.

Further in this another embodiment, the method may further comprise: receiving, at the UPF from the VNF-M a notification of a new HAG deployment; maintaining, at the UPF, existing MP sessions with the HAG; and distributing, at the UPF, new MP sessions between the HAG and the new HAG.

Still further in this another embodiment, the method may further comprise: receiving, at the UPF, an indication of a new IP address of the HUE to be associated with the MP session; and transmitting, from the UPF toward the HAG handling the MP session, MP protocol requests from the new IP address.

In embodiments of the above methods, respectively executed at the HAG and the user plane system, the MP protocol request may be a Multi-Path Transmission Control Protocol, MPTCP, request and the SP protocol request may be a Transmission Control Protocol, TCP, request. Likewise, the MP protocol response nay be an MPTCP request and the SP protocol response may be a Transmission Control Protocol, TCP, response.

In accordance with a third aspect, there is provided a new HAG for communicating a HUE with an Internet server through the HAG, wherein the HAG is enabled to determine whether the HUE accesses through a mobile or a fixed access network.

This HAG is operable to: receive, via a receiver from a user plane system, a multi-path, MP, protocol request originated from a HUE; initiate an MP session for the MP protocol request; transmit, via a transmitter toward an Internet server, the MP protocol request; and receive, via the receiver from the Internet server, a protocol response.

Then, if the received protocol response is a single-path, SP, protocol response, this HAG is operable to: activate a proxy function for the MP session; and transmit, via the transmitter toward the user plane system, an MP protocol response corresponding to the received SP protocol response and a notification of requiring a proxy function. And, if the received protocol response is an MP protocol response, this HAG is operable to: deactivate a proxy function for the MP session; and transmit, via the transmitter toward the user plane system, the received MP protocol response and a notification of not requiring a proxy function.

As for the corresponding method discussed above, with these two possible protocol responses, the HAG would only be involved in further MP protocol requests for the same MP session if the Internet server does not support MP protocol requests. In other words, if a further MP protocol request for the same MP session is received, the HAG should take actions to facilitate the communication with the Internet server.

To this end, the HAG may further be operable to: receive, via the receiver from the user plane system, a further MP protocol request originated from the HUE for the same MP session; transform the further MP protocol request into one or more SP protocol requests; and transmit, via the transmitter toward the Internet server, the one or more SP protocol requests.

As for the corresponding method discussed above, different embodiments are envisaged.

In an embodiment, the user plane system may be implemented with a Service Function Chaining, SFC, infrastructure. In this embodiment, at least one of the MP protocol request and the protocol response may be received at the HAG from an SFC forwarder of the user plane system. Also, in this embodiment, at least one of the MP protocol request and the MP protocol response may be transmitted from the HAG toward the SFC forwarder of the user plane system.

In another embodiment, the user plane system may comprise a user plane function, UPF, as defined for e.g. a 5G network. In this another embodiment, the MP protocol request may be received at the HAG from a UPF of the user plane system, and the MP protocol response and notification may be transmitted from the HAG toward the UPF of the user plane system. Also, in this another embodiment, the MP protocol request may be transmitted from the HAG toward the Internet server through a Data Network, DN, and the protocol response may be received at the HAG from the Internet server through the DN.

Irrespective of the above two embodiments of the user plane system, and for scaling the HAG without breaking the existing MP sessions, e.g. in case of requiring more HAG resources, this HAG may further be operable to transmit, via the transmitter toward a Virtual Network Function Manager, VNF-M, a request to deploy a new HAG.

In accordance with a fourth aspect, there is provided a new user plane system for communicating a HUE with an Internet server through a HAG, wherein the HAG is enabled to determine whether the HUE accesses through a mobile or a fixed access network.

This user plane system is operable to: receive, via a receiver, a multi-path, MP, protocol request originated from a HUE; initiate an MP session for the MP protocol request; transmit, via a transmitter toward a HAG, the MP protocol request; and receive, via the receiver from the HAG, an MP protocol response and a notification for the MP protocol request.

Then, if the notification notifies of requiring a proxy function, this user plane system is operable to mark the MP session as proxying further MP protocol requests for the MP session toward the HAG; and, if the notification notifies of not requiring a proxy function, this user plane system is operable to mark the MP session as bypassing the HAG when transmitting further MP protocol requests for the MP session toward the Internet server.

As for the corresponding method discussed above, with these two notifications, if a further MP protocol request is received at the user plane system for the same MP session, the user plane system knows if it should transmit the further MP protocol request toward the HAG or if it should bypass the HAG and transmit the further MP protocol request directly toward the Internet server.

To this end, this user plane system may further be operable to: receive, via the receiver, a further MP protocol request originated from the HUE for the same MP session; if the MP session is marked as proxying, transmit, via the transmitter, the further MP protocol request toward the HAG; and if the MP session is marked as bypassing the HAG, transmit, via the transmitter, the further MP protocol request toward the Internet server.

In an embodiment, the user plane system may be implemented with a Service Function Chaining, SFC, infrastructure. In this embodiment, the user plane system may comprise an SFC forwarder operable to transmit the MP protocol request originated from the HUE toward the HAG, and receive the MP protocol response and the notification from the HAG.

Also, in this embodiment, the user plane system may further be operable to: transmit, from the SFC forwarder to an SFC controller of the SFC infrastructure, a request to deploy a HAG; transmit, from the SFC controller toward a Virtual Network Function Manager, VNF-M, a request to deploy the HAG; and receive, at the SFC controller from the VNF-M, a notification of the HAG deployment.

Further in this embodiment, the user plane system may further be operable to: receive, at the SFC controller from a VNF-M, a notification of a new HAG deployment; and transmit, from the SFC controller to the SFC forwarder, new rules to maintain existing MP sessions with the HAG, and to distribute new MP sessions between the HAG and the new HAG.

Still further in this embodiment, the user plane system may further be operable to: receive, at an SFC controller, an indication of a new IP address of the HUE to be associated with the MP session; and transmit, from the SFC controller to the SFC forwarder, new rules to transmit MP protocol requests from the new IP address toward the HAG handling the MP session.

Still further in this embodiment, the user plane system may comprise an SFC classifier operable to tag the MP protocol request originated from the HUE, and wherein the MP protocol request transmitted to the HAG, via the SFC forwarder, may be a tagged MP protocol request.

In another embodiment, the user plane system may comprise a user plane function, UPF, as defined for e.g. a 5G network. In this another embodiment, the UPF may be operable to transmit the MP protocol request originated from the HUE toward the HAG, and receive the MP protocol response and notification from the HAG.

Also, in this another embodiment, the user plane system may further be operable to: transmit, from the UPF toward a Virtual Network Function Manager, VNF-M, a request to deploy a HAG; and receive, at the UPF from the VNF-M, a notification of the HAG deployment.

Further in this another embodiment, the user plane system may further be operable to: receive, at the UPF from a Virtual Network Function Manager, VNF-M, a notification of a new HAG deployment; maintain, at the UPF, existing MP sessions with the HAG; and distribute, at the UPF, new MP sessions between the HAG and the new HAG.

Still further in this another embodiment, the user plane system may further be operable to: receive, at the UPF, an indication of a new IP address of the HUE to be associated with the MP session; and transmit, from the UPF toward the HAG handling the MP session, MP protocol requests from the new IP address.

In embodiments of the above HAG and user plane system, the MP protocol request may be a Multi-Path Transmission Control Protocol, MPTCP, request and the SP protocol request may be a Transmission Control Protocol, TCP, request. Likewise, the MP protocol response nay be an MPTCP request and the SP protocol response may be a Transmission Control Protocol, TCP, response.

On the other hand, the invention may be practised by one or more computer programs, in accordance with a fifth aspect, each computer program comprising instructions which, when executed on at least one processor, cause the at least one processor to carry out any one of the methods discussed above. In particular, one or more computer program products may respectively comprise the one or more computer programs.

BRIEF DESCRIPTION OF THE DRAWINGS

The features, objects and advantages of the invention will become apparent by reading this description in conjunction with the accompanying drawings, in which:

FIG. 1a and FIG. 1b illustrate an exemplary sequence of actions carried out to detect support for MP requests, wherein the Internet server does not support MP and wherein the HAG acts as a service function in an SFC architecture.

FIG. 2a and FIG. 2b illustrate an exemplary sequence of actions carried out to detect support for MP requests, wherein the Internet server supports MP and wherein the HAG acts as a service function in an SFC architecture.

FIG. 3 illustrates an exemplary sequence of actions carried out to detect support for MP requests, wherein the Internet server does not support MP and wherein the user plane system implements a user plane function UPF of a 5G network.

FIG. 4 illustrates an exemplary sequence of actions carried out to detect support for MP requests, wherein the Internet server supports MP and wherein the user plane system implements a user plane function UPF of a 5G network.

FIG. 5 shows a basic component structure of a HAG in accordance with an embodiment.

FIG. 6 shows a basic component structure of a user plane system in accordance with an embodiment.

FIG. 7 illustrates an exemplary sequence of actions carried out by the HAG, in accordance with an embodiment, to communicate a HUE with an Internet server, which might or might not support MP requests.

FIG. 8 illustrates an exemplary sequence of actions carried out by the user plane system, in accordance with an embodiment, to communicate a HUE with an Internet server, which might or might not support MP requests.

FIG. 9 illustrates an exemplary sequence of actions carried out for auto-provisioning of a HAG node for handling the MP requests, wherein the HAG acts as a service function in an SFC architecture.

FIG. 10 illustrates an exemplary sequence of actions carried out for auto-provisioning of a HAG node for handling the MP requests, wherein the HAG is deployed in a 5G network and wherein the user plane system implements a UPF of a 5G network.

FIG. 11 illustrates an exemplary sequence of actions carried out for scaling the HAG without breaking the existing MP sessions, wherein the HAG acts as a service function in an SFC architecture.

FIG. 12 illustrates an exemplary sequence of actions carried out for scaling the HAG without breaking the existing MP sessions, wherein the HAG is deployed in a 5G network and wherein the user plane system implements a UPF of a 5G network.

FIG. 13 shows a basic component structure of a HAG node in accordance with another embodiment.

FIG. 14 shows a basic component structure of a user plane system in accordance with another embodiment.

FIG. 15 shows a basic component structure of a user plane system in accordance with still another embodiment.

DETAILED DESCRIPTION

The following describes currently preferred embodiments of apparatuses and methods for communicating a HUE 3 with an Internet server 5 through a HAG 1, wherein the HAG is enabled to determine whether the HUE accesses through a mobile or a fixed access network. These methods are respectively executed at the HAG and the user plane system, and are respectively illustrated in FIG. 7 and FIG. 8.

FIG. 7 illustrates a method for communicating a HUE 3 with an Internet server 5 through a HAG 1, wherein the HAG is enabled to determine whether the HUE accesses through a mobile or a fixed access network.

This method is executed at the HAG and comprises a step S-710 of receiving, from a user plane system 2, an MP protocol request originated from a HUE 3; a step S-720 of initiating an MP session for the MP protocol request, a step S-730 of transmitting, toward an Internet server, the MP protocol request; and a step S-740 of receiving, from the Internet server, a protocol response for the MP protocol request.

Then, depending on the protocol response, the HAG takes different actions. If the protocol response is an SP protocol response, the method comprises a step S-750 of activating a proxy function for the MP session and transmitting, toward the user plane system 2, an MP protocol response corresponding to the received SP protocol response and a notification of requiring a proxy function. However, if the protocol response is an MP protocol response, the method comprises a step S-760 of deactivating a proxy function for the MP session, and transmitting, toward the user plane system 2, the received MP protocol response and a notification of not requiring a proxy function.

FIG. 8 illustrates a method for communicating a HUE 3 with an Internet server 5 through a HAG 1, wherein the HAG is enabled to determine whether the HUE accesses through a mobile or a fixed access network, but in this case, this method is executed at the user plane system 2.

This method comprises a step S-810 of receiving an MP protocol request originated from a HUE 3; a step S-820 of initiating an MP session for the MP protocol request; a step S-830 of transmitting, toward the HAG, the MP protocol request; and a step S-840 of receiving, from the HAG, an MP protocol response and a notification for the MP protocol request.

Then, depending on the notification, the user plane system takes different actions. If the notification notifies of requiring a proxy function, the method comprises a step S-850 of marking the MP session as proxying further MP protocol requests for the MP session toward the HAG 1. However, if the notification notifies of not requiring a proxy function, the method comprises a step S-860 of marking the MP session as bypassing the HAG when transmitting further MP protocol requests for the MP session toward the Internet server 5.

On the other hand, the HAG 1 and the user plane system 2 are described in the following with reference to specific implementations as respectively illustrated in FIG. 5 and FIG. 6, in one embodiment, and as respectively illustrated in FIG. 13 and FIG. 14, or FIG. 13 and FIG. 15, in alternative embodiments. Both embodiments for the HAG, which are discussed with reference to FIG. 5 and FIG. 13, may be combined with any one of embodiments for the user plane system, which are discussed with reference to FIG. 6, FIG. 14 and FIG. 15.

In accordance with an embodiment illustrated in FIG. 5, the HAG 1 may comprise at least one processor 520, and at least one memory 510 that stores processor-executable instructions 514. In this HAG, the at least one processor interfaces with the at least one memory to execute the processor-executable instructions, whereby the HAG is operable to perform the actions disclosed in the following.

The HAG may be operable to receive, via a receiver 530 from a user plane system 2, an MP protocol request originated from a HUE 3, initiate an MP session for the MP protocol request, transmit, via a transmitter 540 toward an Internet server 5, the MP protocol request, and receive, via the receiver 530 from the Internet server 5, a protocol response.

Then, depending on the received protocol response, the HAG is further operable to perform different actions. If the protocol response is an SP protocol response, the HAG 1 is operable to activate a proxy function for the MP session and transmit, via the transmitter 540 toward the user plane system 2, an MP protocol response corresponding to the received SP protocol response and a notification of requiring a proxy function. However, if the protocol response is an MP protocol response, the HAG 1 is operable to deactivate a proxy function for the MP session and transmit, via the transmitter 540 toward the user plane system 2, the received MP protocol response and a notification of not requiring a proxy function.

In a sub-embodiment, a protocol handler 524 running in a processor 520 may receive the MP protocol request from the user plane system, initiate the MP session for the MP protocol request, transmit the MP protocol request toward the Internet server and receive the protocol response from the Internet server; and a proxy handler 527 running in a processor 520 may activate or deactivate the proxy function for the MP session and transmit the MP protocol response toward the user plane system.

If required at all, the HAG 1 may be complemented with a data section 518 in memory to store data related to one or more MP sessions, such as e.g. whether proxy is activated or deactivated and any one of subscription data, operation data, results, etc relating to the HUE.

The HAG 1 illustrated in FIG. 5 may thus comprise the at least one processor 520 and the at least one memory 510, both in communication with each other, with the protocol handler 524, the proxy handler 527, the receiver 530 and the transmitter 540, and with other elements or units of the HAG 1. The at least one memory 510 may comprise volatile and/or non-volatile memory. The at least one memory 510 may have a computer program 514 and data 518 stored therein. The computer program 514 may be loaded in the at least one memory 510 from a computer program product 550, such as any non-transitory computer readable medium, in which the computer program is stored. The data 518 may comprise data related to one or more MP sessions, such as e.g. whether proxy is activated or deactivated and any one of subscription data, operation data, results, etc relating to the HUE. The at least one processor 520 may be configured to carry out the functions of the protocol handler 524 and the proxy handler 527.

In accordance with another embodiment illustrated in FIG. 13, the HAG 1 may be operable to receive, via a receiver 530 from a user plane system 2, an MP protocol request originated from a HUE 3, initiate an MP session for the MP protocol request, transmit, via a transmitter 540 toward an Internet server 5, the MP protocol request, and receive, via the receiver 530 from the Internet server 5, a protocol response.

Then, also for the embodiment illustrated in FIG. 13 and depending on the received protocol response, the HAG is further operable to perform different actions. If the protocol response is an SP protocol response, the HAG 1 is operable to activate a proxy function for the MP session and transmit, via the transmitter 540 toward the user plane system 2, an MP protocol response corresponding to the received SP protocol response and a notification of requiring a proxy function. However, if the protocol response is an MP protocol response, the HAG 1 is operable to deactivate a proxy function for the MP session and transmit, via the transmitter 540 toward the user plane system 2, the received MP protocol response and a notification of not requiring a proxy function.

As discussed above in respect of the embodiment illustrated in FIG. 5, also in a sub-embodiment for this embodiment illustrated in FIG. 13, the HAG may also comprise any one of a protocol handler 524 configured to receive the MP protocol request from the user plane system, initiate the MP session for the MP protocol request, transmit the MP protocol request toward the Internet server and receive the protocol response from the Internet server, and a proxy handler 527 configured to activate or deactivate the proxy function for the MP session and transmit the MP protocol response toward the user plane system.

In this embodiment of the HAG 1 illustrated in FIG. 13, the protocol handler 524, the proxy handler 527, the receiver 530 and the transmitter 540 may be implemented as separate modules comprising hardware and software, and may also be implemented by sharing some hardware and/or software resources amongst any ones of them.

In accordance with an embodiment illustrated in FIG. 6, the user plane system 2 may comprise at least one processor 620, and at least one memory 610 that stores processor-executable instructions 614. In this user plane system, the at least one processor interfaces with the at least one memory to execute the processor-executable instructions, whereby the user plane system is operable to perform the actions disclosed in the following.

The user plane system may be operable to receive, via a receiver 630, an MP protocol request originated from a HUE 3, initiate an MP session for the MP protocol request, transmit, via a transmitter 640 toward a HAG 1, the MP protocol request, and receive, via the receiver 630 from the HAG 1, an MP protocol response and a notification for the MP protocol request.

Then, depending on the received notification, the user plane system is further operable to perform different actions. If the notification notifies of requiring a proxy function, the user plane system 2 is operable to mark the MP session as proxying further MP protocol requests for the MP session toward the HAG 1. However, if the notification notifies of not requiring a proxy function, the user plane system 2 is operable to mark the MP session as bypassing the HAG when transmitting further MP protocol requests for the MP session toward the Internet server.

In a sub-embodiment, a UPF 25 running in a processor 620 may perform all the actions that the user plane system 2 illustrated in FIG. 6 is configured to do, as discussed above.

In another alternative sub-embodiment, the user plane system may implement a so-called Service Function Chaining (SFC), whereby packets fulfilling certain criteria traverse a sequence of service functions (SF) in its way to its destination.

In this alternative sub-embodiment, an SFC classifier 21 running in a processor 620 may receive the MP protocol request originated from a HUE 3, and an SFC forwarder 23 running in a processor 620 may initiate the MP session for the MP protocol request, transmit the MP protocol request toward the HAG 1, receive the MP protocol response and the notification for the MP protocol request from the HAG, and mark the MP session as proxying further MP protocol requests for the MP session toward the HAG 1, or as bypassing the HAG when transmitting further MP protocol requests for the MP session toward the Internet server. In this alternative sub-embodiment, an SFC controller 22 running in a processor 620 might be provided to perform functions to be further discussed in view of additional embodiments.

If required at all, the user plane system 2 may be complemented with a data section 618 in memory to store data related to one or more MP sessions, such as e.g. whether proxying further MP protocol requests for the MP session toward the HAG or bypassing the HAG when transmitting further MP protocol requests for the MP session toward the Internet server, and any one of subscription data, operation data, results, etc relating to the HUE.

The user plane system 2 illustrated in FIG. 6 may thus comprise the at least one processor 620 and the at least one memory 610, both in communication with each other, with the receiver 630 and the transmitter 640, with the UPF 25 or with the SFC classifier 21, SFC forwarder 23 and SFC controller 22, and with other elements or units of the user plane system 2. The at least one memory 610 may comprise volatile and/or non-volatile memory. The at least one memory 610 may have a computer program 614 and data 618 stored therein. The computer program 614 may be loaded in the at least one memory 610 from a computer program product 650, such as any non-transitory computer readable medium, in which the computer program is stored. The data 618 may comprise data related to one or more MP sessions, such as e.g. whether proxying further MP protocol requests for the MP session toward the HAG or bypassing the HAG when transmitting further MP protocol requests for the MP session toward the Internet server, and any one of subscription data, operation data, results, etc relating to the HUE. The at least one processor 620 may be configured to carry out the functions of the UPF 25 or the SFC classifier 21, SFC forwarder 23 and SFC controller 22.

In accordance with other embodiments illustrated in FIG. 14 and FIG. 15, the user plane system 2 may be operable to receive, via a receiver 630, an MP protocol request originated from a HUE 3, initiate an MP session for the MP protocol request, transmit, via a transmitter 640 toward a HAG 1, the MP protocol request, and receive, via the receiver 630 from the HAG 1, an MP protocol response and a notification for the MP protocol request.

Then, also for the embodiments illustrated in FIG. 14 and FIG. 15, and depending on the received notification, the user plane system is further operable to perform different actions. If the notification notifies of requiring a proxy function, the user plane system 2 is operable to mark the MP session as proxying further MP protocol requests for the MP session toward the HAG 1. However, if the notification notifies of not requiring a proxy function, the user plane system 2 is operable to mark the MP session as bypassing the HAG when transmitting further MP protocol requests for the MP session toward the Internet server.

As discussed above in respect of a sub-embodiment of the embodiment illustrated in FIG. 6, also in the embodiment illustrated in FIG. 14, the user plane system 2 may comprise a receiver 630, a transmitter 640 and a UPF 25 operable to receive, via the receiver 630, an MP protocol request originated from a HUE 3, initiate an MP session for the MP protocol request, transmit, via the transmitter 640 toward a HAG 1, the MP protocol request, receive, via the receiver 630 from the HAG 1, an MP protocol response and a notification for the MP protocol request, and mark the MP session as proxying toward the HAG or as bypassing the HAG, depending on the received notification. Apart from that, the user plane system 2 might comprise a VNF-M 26 to perform functions to be further discussed in view of additional embodiments.

In this embodiment of the user plane system 2 illustrated in FIG. 14, the UPF 25, the VNF-M 26, the receiver 630 and the transmitter 640 may be implemented as separate modules comprising hardware and software, and may also be implemented by sharing some hardware and/or software resources amongst any ones of them.

As discussed above in respect of another sub-embodiment of the embodiment illustrated in FIG. 6, also in the embodiment illustrated in FIG. 15, the user plane system 2 may implement a so-called Service Function Chaining (SFC) with several modules in charge of respective service functions.

As illustrated in FIG. 15, the user plane system 2 may thus comprise: a classifying module comprising an SFC classifier 21, a receiver 630 and a transmitter 640; and a forwarding module comprising an SFC forwarder 23, a receiver 630 and a transmitter 640. The classifying module may be operable to receive, at the SFC classifier 21 via receiver 630, the MP protocol request originated from the HUE and transmit, toward the forwarding module via transmitter 640, this MP protocol request. The forwarding module may be operable to receive, at the SFC forwarder 23 via receiver 630, and transmit, toward the HAG 1 via transmitter 640, the MP protocol request originated from the HUE. The forwarding module may be operable to initiate an MP session for the MP protocol request, receive, from the HAG via receiver 630, an MP protocol response and a notification for the MP protocol request, and mark the MP session, depending on the notification, as proxying toward the HAG or as bypassing the HAG, further MP protocol requests for the MP session.

In this embodiment illustrated in FIG. 15, the user plane system 2 might also comprise a controlling module comprising an SFC controller 22, a receiver 630 and a transmitter 640; and a virtualization module comprising a VNF-M 26, a receiver 630 and a transmitter 640. Both controlling module and virtualization module, particularly the SFC controller 22 and the VNF-M 26, may be provided to perform functions to be further discussed in view of additional embodiments.

In an embodiment, any ones of the classifying module, forwarding module, controlling module and virtualization module may be provided as separate network nodes. In an embodiment, any ones of the classifying module, forwarding module, controlling module and virtualization module may be implemented in a single network node as separate modules comprising hardware and software, and may also be implemented by sharing some hardware and/or software resources amongst any ones of them. For example, any ones of the SFC classifier 21, SFC controller 22, SFC forwarder 23 and VNF-M 26 might share unique receiver 630 and transmitter 640 in user plane system 2.

In the following, more detailed embodiments are discussed for different scenarios and for the different alternatives to implement the user plane system 2, which have been already discussed above.

In these embodiments, the MP protocol request may exemplary correspond to an MP-TCP request, so that the MP protocol response corresponds to an MP-TCP response, and the SP protocol response may exemplary correspond to a TCP response.

For the sake of simplicity, the MP protocol request may simply be referred to as MP request, the MP protocol response may simply be referred to as MP response, whereas the SP protocol response may simply be referred to as SP response or as TCP response.

A first scenario is illustrated in FIG. 1a and FIG. 1b, wherein the Internet server 5 does not support multipath (MP) and wherein the HAG acts as a service function in an SFC architecture.

As illustrated in FIG. 1a, the HUE 3 transmits during step S-100 an MP request. The MP request is received at an SFC classifier 21, which may detect the MP request using Deep Packet Inspection (DPI) capabilities. Detection is based on the existence of an MP_CAPABLE option subtype in MP-TCP options. The SFC classifier may tag the MP request and transmit it to the SFC chain. How the SFC Classifier tags the packet may depend on the overlay encapsulation used in a SFC, e.g. Network Service Header (NSH).

The SFC classifier transmits during step S-105 the MP request toward the SFC forwarder 23, and the latter transmits during step S-110 the MP request toward the HAG 1. The transmission to the HAG may be based on the tag, if received with the MP request, or on internal policies or rules configured at the SFC forwarder.

The HAG initiates an MP session for the MP request and transmits the received MP request toward the Internet server 5, through the SFC forwarder during steps S-115 and S-120, and through a further SFC classifier 24 during step S-125.

As the Internet server in this scenario does not support the MP request, it answers with an SP response, e.g. a TCP response. According to the standard, in case that MP is not supported, the server must remove all MP-TCP options of the MP request. This SP response is transmitted from the Internet server toward the HAG 1, through the further SFC classifier 24 during step S-130 and through the SFC forwarder 23 during steps S-135 and S-140.

Optionally, as commented above, the further SFC classifier 24 may tag the TCP response based on the 5-tuple of the original MP request, instead of using DPI capabilities. This allows to correctly classify an MP-TCP flow even if the Internet server removed MP-TCP options. This procedure may require the implementation of a fast path or flow cache.

As receiving the SP response at the HAG during step S-140, the HAG assumes the Internet server does not support MP requests, activates during step S-145 a proxy function for the MP session and transmits, toward the SFC forwarder 23 during step S-150, an MP response corresponding to the received SP protocol response and a notification of requiring a proxy function.

The SFC forwarder 23 may mark during step S-155 proxying toward the HAG further MP requests for this MP session. This step may be superfluous if the SFC forwarder assumes this marking as a default value that might be changed at request from the SFC controller as described in another embodiment.

Then, the MP response is transmitted back, during step S-160, from the SFC forwarder 23 toward the SFC classifier and, during step S-165, from the latter toward the HUE.

Afterwards, as illustrated in FIG. 1b, the HUE 3 transmits during step S-170 a further MP request toward the user plane system 2, i.e. toward the SFC architecture. This further MP request is received at the SFC classifier 21 and transmitted during step S-172 toward the SFC forwarder 23. The SFC forwarder determines, based on the previous mark of proxying or on a default value, that the HAG is required and transmits the further MP request during step S-174 toward the HAG.

The HAG determines the proxy function is active for the MP session and, during step S-176, transforms the further MP protocol request into one or more SP requests, i.e. TCP requests.

Then, the HAG transmits the one or more SP requests toward the Internet server 5, through the SFC forwarder during steps S-178 and S-180, and through the further SFC classifier 24 during step S-182.

The Internet server 5 transmits one or more corresponding SP responses toward the HAG 1, through the further SFC classifier 24 during step S-184 and through the SFC forwarder 23 during steps S-186 and S-188.

Then, the HAG prepares an MP response corresponding to the one or more SP responses and transmits during step S-190 the MP response toward the SFC forwarder 23. The MP response is transmitted back, during step S-192, from the SFC forwarder 23 toward the SFC classifier and, during step S-194, from the latter toward the HUE.

This embodiment provides a solution to communicate a HUE supporting MP requests with an Internet server not supporting MP requests, via an SFC architecture.

A second scenario is illustrated in FIG. 2a and FIG. 2b, wherein the Internet server 5 supports multipath (MP) and wherein the HAG acts as a service function in an SFC architecture.

As illustrated in FIG. 2a, the HUE 3 transmits during step S-200 an MP request. The MP request is received at an SFC classifier 21, which may detect the MP request using Deep Packet Inspection (DPI) capabilities. Detection is based on the existence of an MP_CAPABLE option subtype in MP-TCP options. The SFC classifier may tag the MP request and transmit it to the SFC chain. How the SFC Classifier tags the packet may depend on the overlay encapsulation used in a SFC, e.g. Network Service Header (NSH).

The SFC classifier transmits during step S-205 the MP request toward the SFC forwarder 23, and the latter transmits during step S-210 the MP request toward the HAG 1. The transmission to the HAG may be based on the tag, if received with the MP request, or on internal policies or rules configured at the SFC forwarder.

The HAG initiates an MP session for the MP requests and transmits the received MP request toward the Internet server 5, through the SFC forwarder during steps S-215 and S-220, and through a further SFC classifier 24 during step S-225.

As the Internet server 5 in this scenario supports the MP request, it answers with an MP response. This MP response is transmitted from the Internet server toward the HAG 1, through the further SFC classifier 24 during step S-230 and through the SFC forwarder 23 during steps S-235 and S-240.

Optionally, as commented above, the further SFC classifier 24 may tag the MP response based on the 5-tuple of the original MP request, instead of using DPI capabilities.

As receiving the MP response at the HAG during step S-240, the HAG assumes the Internet server supports MP requests, deactivates during step S-245 a proxy function for the MP session and transmits, toward the SFC forwarder 23 during step S-250, the MP response and a notification of not requiring a proxy function for the MP session.

Then, the MP response is transmitted back, during step S-255, from the SFC forwarder 23 toward the SFC classifier and, during step S-260, from the latter toward the HUE.

As illustrated in FIG. 2b and more or less in parallel with, namely before or after, the transmission of the response and the notification from the HAG 1 toward the SFC forwarder 23, the HAG 1 transmits during step S-270 toward an SFC controller 22 a HAG offloading request indicating that this MP session does not requires a proxy function.

The SFC controller 22 installs during step S-272 a new rule in the SFC forwarder 23 to mark bypassing the HAG for this MP session.

The SFC controller 22, illustrated in FIG. 6 and FIG. 15, may thus be configured to receive the HAG offloading request from the HAG 1 and install in the SFC forwarder 23 the new rule to bypass the HAG for the MP session.

Afterwards, the HUE 3 transmits during step S-276 a further MP request toward the user plane system 2, i.e. toward the SFC architecture. This further MP request is received at the SFC classifier 21 and transmitted during step S-278 toward the SFC forwarder 23. The SFC forwarder determines, based on the previous mark of bypassing the HAG, that the HAG is not required and transmits the further MP request during step S-280 toward the further SFC classifier 24, which in turn transmits the further MP request during step S-282 toward the Internet server 5.

The Internet server 5 transmits during step S-284 an MP response for the MP request toward the further SFC classifier 24, and the MP response is transmitted back, during step S-286, from the further SFC classifier 24 toward the SFC forwarder 23, during step S-288, from the SFC forwarder 23 toward the SFC classifier and, during step S-290, from the latter toward the HUE.

This embodiment provides a solution to communicate a HUE supporting MP requests with an Internet server also supporting MP requests and without unnecessarily involving a proxy function, via an SFC architecture.

A particular embodiment for the second scenario illustrated in FIG. 2a and FIG. 2b is provided to allow that a network operator might force the use of a particular access. This particular embodiment is referred to as access overriding procedure in this specification and is disclosed in the following.

In this embodiment for access overriding procedure, the Internet server 5 implements a packet steering based on network parameters like e.g. Round Trip Time (RTT). The standard implementations of MP requests try to select the best access to maximize the network performance. The proposal is to use the HAG as proxy of each MP request sub-flow, which allows re-doing the packet steering.

To this end, even if the Internet server 5 supports MP requests, the HAG 1 is kept in the SFC of the flow. In this situation, the HAG 1 may receive a new downlink MP request from the Internet server 5.

Then, the HAG 1 may check a configured network operator policy and decide if the downlink MP request has the access destination. In case that the network operator policy steering result is different, the HAG may transmit the downlink MP request to the HUE using a proper downlink MP request sub-flow through a different access.

A third scenario is illustrated in FIG. 3, wherein the Internet server 5 does not support multipath (MP) and wherein the user plane system 2 implements a user plane function (UPF) of a 5G network.

As illustrated in FIG. 3, the HUE 3 transmits during step S-300 an MP request, through a radio access network (RAN) 4 toward a UPF 25 in the user plane system 2. The UPF 25 may detect the MP request using DPI capabilities. Detection is based on the existence of an MP_CAPABLE option subtype in MP-TCP options. The UPF 25 transmits during step S-305 toward a HAG 1 the MP request.

The HAG initiates an MP session for the MP request and transmits during step S-310 the received MP request toward the Internet server 5. The MP request may be transmitted through a Data Network (DN) 6.

As the Internet server in this scenario does not support the MP request, it answers with an SP response, e.g. a TCP response. According to the standard, in case that MP is not supported, the server must remove all MP-TCP options of the MP request. This SP response is transmitted during a step S-315 from the Internet server 5 toward the HAG 1.

As receiving the SP response at the HAG during step S-315, the HAG assumes the Internet server does not support MP requests, activates during step S-320 a proxy function for the MP session and transmits toward the UPF 25 an MP response corresponding to the received SP protocol response, during step S-325, and a notification of requiring a proxy function, during step S-330. The MP response and notification may be transmitted together in a unique message.

The UPF 25 may mark during step S-335 proxying toward the HAG further MP requests for this MP session. Then, the MP response is transmitted back, during step S-340, from the UPF 25 toward the HUE 3.

Afterwards, as illustrated in FIG. 3, the HUE 3 transmits during step S-345 a further MP request toward the user plane system 2, i.e. toward the UPF 25. This further MP request is received at the UPF 25, which determines based on the previous mark of proxying, that the HAG is required and transmits during step S-350 the further MP request toward the HAG 1.

The HAG determines the proxy function is active for the MP session and, during step S-355, transforms the further MP protocol request into one or more SP requests, i.e. TCP requests.

Then, the HAG transmits during step S-360 the one or more SP requests toward the Internet server 5, likely through the DN 6.

The Internet server 5 transmits during step S-365 one or more corresponding SP responses toward the HAG 1, likely through the DN 6.

Then, the HAG prepares an MP response corresponding to the one or more SP responses and transmits during step S-370 the MP response toward the UPF 25. The MP response is transmitted back, during step S-375, from the UPF 25 toward the HUE.

This embodiment provides a solution to communicate in a 5G network a HUE supporting MP requests with an Internet server not supporting MP requests.

A fourth scenario is illustrated in FIG. 4, wherein the Internet server 5 supports multipath (MP) and wherein the user plane system 2 implements a user plane function (UPF) of a 5G network.

As illustrated in FIG. 4, the HUE 3 transmits during step S-400 an MP request, through a radio access network (RAN) 4 toward a UPF 25 in the user plane system 2. The UPF 25 may detect the MP request using DPI capabilities. Detection is based on the existence of an MP_CAPABLE option subtype in MP-TCP options. The UPF 25 transmits during step S-405 toward a HAG 1 the MP request.

The HAG initiates an MP session for the MP request and transmits during step S-410 the received MP request toward the Internet server 5. The MP request may be transmitted through a Data Network (DN) 6.

As the Internet server 5 in this scenario supports the MP request, it answers with an MP response. This MP response is transmitted during step S-415 from the Internet server 5 toward the HAG 1, likely through the DN 6.

As receiving the MP response at the HAG during step S-415, the HAG assumes the Internet server supports MP requests, deactivates during step S-420 a proxy function for the MP session and transmits toward the UPF 25 the MP response, during step S-425, and a notification of not requiring a proxy function for the MP session, during step S-430. The MP response and notification may be transmitted together in a unique message.

The UPF 25 may mark during step S-435 bypassing the HAG for further MP requests for this MP session. Then, the MP response is transmitted back, during step S-440, from the UPF 25 toward the HUE 3.

Afterwards, as illustrated in FIG. 4, the HUE 3 transmits during step S-445 a further MP request toward the user plane system 2, i.e. toward the UPF 25. This further MP request is received at the UPF 25, which determines based on the previous mark of bypassing, that the HAG is not required and transmits during step S-450 the further MP request toward the Internet server 5.

The Internet server 5 transmits during step S-455 an MP response for the MP request toward the UPF 25, and the MP response is transmitted, during step S-460, from the UPF 25 toward the HUE.

This embodiment provides a solution to communicate in a 5G network a HUE supporting MP requests with an Internet server also supporting MP requests and without unnecessarily involving a proxy function.

A particular embodiment for the fourth scenario illustrated in FIG. 4 is provided to allow that a network operator might force the use of a particular access. This particular embodiment is referred to as access overriding procedure in this specification and is disclosed in the following.

In this embodiment for access overriding procedure, the Internet server 5 implements a packet steering based on network parameters like e.g. Round-Trip Time (RTT). The standard implementations of MP requests try to select the best access to maximize the network performance. The proposal is to use the HAG as proxy of each MP request sub-flow, which allows re-doing the packet steering.

To this end, even if the Internet server 5 supports MP requests, the HAG 1 is kept as a proxy function. In this situation, the HAG 1 may receive a new downlink MP request from the Internet server 5.

Then, the HAG 1 may check a configured network operator policy and decide if the downlink MP request has the access destination. In case that the network operator policy steering result is different, the HAG may transmit the downlink MP request to the HUE using a proper downlink MP request sub-flow through a different access.

Apart from the embodiments above for handling MP requests, this specification also discloses embodiments for auto-provisioning of a HAG node for handling the MP requests, such as those shown in FIG. 9 and FIG. 10.

For instance, FIG. 9 illustrates an embodiment wherein the HAG acts as a service function in an SFC architecture and is deployed with help of a VNF-M 26 and a Virtual Infrastructure Manager (VIM) 7.

As illustrated in FIG. 9, the HUE 3 transmits during step S-900 an MP request. The MP request is received at an SFC classifier 21, which may detect the MP request using Deep Packet Inspection (DPI) capabilities. Detection is based on the existence of an MP_CAPABLE option subtype in MP-TCP options. The SFC classifier may tag the MP request and transmit it to the SFC chain. How the SFC Classifier tags the packet may depend on the overlay encapsulation used in a SFC, e.g. Network Service Header (NSH).

The SFC classifier transmits during step S-905 the MP request toward the SFC forwarder 23. The SFC forwarder, possibly based on tag, may determine that the MP request should be forwarded to a HAG node, but there is no such node in the SFC.

Then, the SFC forwarder transmits during step S-910 the MP request (via an Open-flow message) to an SFC controller 22 to ask for a HAG deployment. The SFC controller 22 transmits during step S-915 toward a VNF-M 26 a HAG provisioning request, and the latter follows the process for deploying a new VNF by forwarding the HAG provisioning request during step S-920 toward the VIM 7.

The VIM 7 deploys a HAG instance during step S-925, the VNF-M 26 configures the HAG instance during step S-950 and notifies of the deployment to the SFC controller 22 during step S-955.

The SFC controller 22 returns during step S-960 the MP request (via Open-flow) toward the SFC forwarder 23, and the latter transmits during step S-965 the MP request to the HAG 1 as done, for example, in steps S-110 shown in FIG. 1a or S-210 shown in FIG. 2a, and then similar actions as illustrated in FIG. 1a and FIG. 1b, or FIG. 2a and FIG. 2b, may be followed.

Also for instance, FIG. 10 illustrates an embodiment wherein the HAG is deployed in a 5G network with help of a VNF-M 26 and a VIM 7, and wherein the user plane system 2 implements a UPF of a 5G network.

As illustrated in FIG. 10, the HUE 3 transmits during step S-1000 an MP request, through a radio access network (RAN) 4 toward a UPF 25 in the user plane system 2. The UPF 25 may detect the MP request using DPI capabilities, which allows classification of MP traffic per flow. Detection may be based on the existence of an MP_CAPABLE option subtype in MP-TCP options.

The UPF 25, possibly based on the classification, may determine that the MP request should be forwarded to a HAG node, but there is no such node in the user plane 2.

Then, the UPF 25 transmits during step S-1005 toward a VNF-M 26 a HAG provisioning request, and the latter follows the process for deploying a new VNF by forwarding the HAG provisioning request during step S-1010 toward the VIM 7.

The VIM 7 deploys a HAG instance during step S-1015, notifies of the deployment to the VNF-M 26 during step S-1020, the VNF-M 26 configures the HAG instance during step S-1025, and the VNF-M 26 notifies of the deployment to the UPF 25 during step S-1030.

The UPF 25 may transmit now during step S-1035 the MP request to the HAG 1 as done, for example, in steps S-305 shown in FIG. 3 or S-405 shown in FIG. 4, and then similar actions as illustrated in FIG. 3, or FIG. 4, may be followed.

Apart from the embodiments discussed above for handling MP requests and for auto-provisioning of a HAG node for handling the MP requests, this specification also discloses embodiments for scaling the HAG, without breaking the existing MP sessions, such as those shown in FIG. 11 and FIG. 12.

For instance, FIG. 11 illustrates an embodiment wherein the HAG acts as a service function in an SFC architecture and is deployed with help of a VNF-M 26 and a Virtual Infrastructure Manager (VIM) 7.

As illustrated in FIG. 11, when HAG detects that a scale-out is required, due to the need of new resources (e.g. CPU, Memory, Application) for handling current amount of traffic, the HAG may transmit a scale request toward the VNF-M 26 during step S-1100.

The VNF-M 26 follows the process for deploying a new VNF by transmitting a HAG provisioning request during step S-1105 toward the VIM 7.

The VIM 7 deploys a new HAG instance 1b during step S-1110, the VNF-M 26 configures the HAG instance during step S-1115 and notifies of the deployment, i.e. a HAG scale event, to the SFC controller 22 during step S-1120.

The SFC controller 22 transmits, during step S-1125 toward the SFC forwarder 23, HAG scale rules to maintain existing MP sessions with the HAG 1, and to distribute new MP sessions between the HAG 1 and the new HAG 1b.

Further MP requests from the HUE 3 received during step S-1130 at the SFC classifier 21, are forwarded during step S-1135 toward the SFC forwarder 23. Then, the SFC forwarder may determine if a received MP request belongs to an existing MP session and, in this case, such MP request is transmitted to the first HAG 1; otherwise, MP requests of new MP sessions are balanced between the HAG 1 and the new HAG 1b.

Also for instance, FIG. 12 illustrates an embodiment wherein the HAG is deployed in a 5G network with help of a VNF-M 26 and a VIM 7, and wherein the user plane system 2 implements a UPF of a 5G network.

As illustrated in FIG. 12, when HAG detects that a scale-out is required, due to the need of new resources (e.g. CPU, Memory, Application) for handling current amount of traffic, the HAG may transmit a scale request toward the VNF-M 26 during step S-1200.

The VNF-M 26 follows the process for deploying a new VNF by transmitting a HAG provisioning request during step S-1205 toward the VIM 7.

The VIM 7 deploys a new HAG instance 1b during step S-1210, notifies of the deployment to the VNF-M 26 during step S-1215, the VNF-M 26 configures the HAG instance during step S-1220 and notifies of the deployment, i.e. a HAG scale event, to the UPF 25 during step S-1225.

The UPF 25 installs during step S-1230 HAG scale rules to maintain existing MP sessions with the HAG 1, and to distribute new MP sessions between the HAG 1 and the new HAG 1b.

Then, upon receiving at the UPF 25 during step S-1240 further MP requests from the HUE 3, the UPF 25 may determine if a received MP request belongs to an existing MP session and, in this case, such MP request is transmitted to the first HAG 1; otherwise, MP requests of new MP sessions are balanced between the HAG 1 and the new HAG 1b.

Apart from the embodiments discussed above for handling MP requests, for auto-provisioning of a HAG node for handling the MP requests, and for scaling the HAG without breaking the existing MP sessions, this specification also discloses embodiments for aggregation of multipath sub-flows.

These embodiments, which are not illustrated in any drawing, may be provided to guarantee that the same HAG instance handles all multipath sub-flows for the same user.

In an embodiment, wherein the HAG acts as a service function in an SFC architecture, and once an MP session has been established for a HUE 3 between a HAG 1 and a user plane system 2, the HUE 3 may transmit toward the SFC classifier 21 a further MP request with a special header, called ADD_ADDRESS, indicating that the HUE has an additional IP address in other access.

The SFC classifier, receiving this further MP request, may tag it as part of existing MP flows. In parallel, the SFC classifier transmits an Open-flow message toward the SFC controller, intended to let the SFC controller know the additional IP address of the HUE and associate it to the existing HUE flows. The SFC controller sends new rules to the SFC forwarder indicating that MP requests from the additional IP address shall be forwarded to the same HAG, whilst the SFC classifier transmits this further MP request toward the SFC forwarder.

The SFC forwarder applies the new rules to the further MP request and transmits it to the same HAG for the HUE.

In an embodiment, wherein the HAG is deployed in a 5G network and the user plane system 2 implements a UPF of a 5G network, and once an MP session has been established for a HUE 3 between a HAG 1 and a user plane system 2, the HUE 3 may transmit toward a UPF 25 a further MP request with a special header, called ADD_ADDRESS, indicating that the HUE has an additional IP address in other accesses.

The UPF, receiving this further MP request, installs an internal rule indicating that MP requests from the additional IP address shall be forwarded to the same HAG. The internal rule matches packets from the additional IP address, from any port to any IP, port tuple, which is classified as MP request.

The UPF can send this further MP request to the same HAG, and the HUE can transmit still further MP requests using the additional IP address.

The invention may also be practised by one or more computer programs, loadable into an internal memory of a computer with input and output units as well as with a processor. The computer programs comprising executable code adapted to carry out the above method steps when running in the computer. The executable code may be recorded in a carrier readable means in a computer.

As used herein, the word "comprising" does not exclude the presence of other elements or steps than those listed, and the words "a" or "an" preceding an element do not exclude the presence of a plurality of such elements. Further, any reference signs do not limit the scope of the claims, the invention may be, at least in part, implemented by means of both hardware and software, and several "means" or "units" may be represented by the same item of hardware.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for communicating a hybrid user equipment (HUE) with an Internet server through a hybrid access gateway (HAG), the HAG being enabled to determine whether the HUE accesses through a mobile or a fixed access network, the method executed at the HAG and comprising:
   receiving, from a user plane function (UPF) in a user plane system, a multi-path (MP) protocol request originated from a HUE, the UPF detecting the MP request using Deep Packet Inspection (DPI) capabilities, the detection being based on an existence of an MP-CAPABLE option subtype in MP-Transmission Control Protocol (TCP) options;
   initiating an MP session for the MP protocol request;
   transmitting, toward an Internet server, the MP protocol request;
   receiving, from the Internet server, a protocol response;
   if the protocol response is a single-path (SP) protocol response:
      activating a proxy function for the MP session; and
      transmitting, toward the user plane system, an MP protocol response corresponding to the received SP protocol response and a notification of requiring a proxy function;
   if the protocol response is an MP protocol response:
      deactivating a proxy function for the MP session; and
      transmitting, toward the user plane system, the received MP protocol response and a notification of not requiring a proxy function;
   receiving, from the user plane system, a further MP protocol request originated from the HUE for the same MP session;
   transforming the further MP protocol request into one or more SP protocol requests;
   transmitting, toward the Internet server, the one or more SP protocol requests, the HAG checking a configured network operator policy and deciding if a downlink MP request addresses a destination through an access network indicated by the policy and, if the network operator policy indicates a different access network than addressed by the downlink MP request, the HAG transmitting the downlink MP request to the HUE using a proper downlink MP request sub-flow through a different access network; and
   the HAG acting as a service function in a Service Function Chaining (SFC) architecture and deployed using a Virtual Network Function Manager (VNF-M) and a Virtual Infrastructure Manager (VIM), the MP protocol request and the protocol response received at the HAG from a SFC forwarder of the user plane system.

2. The method of claim 1, wherein at least one of the MP protocol request and the MP protocol response is transmitted from the HAG toward the SFC forwarder of the user plane system.

3. The method of claim 1, wherein the MP protocol request is received at the HAG from a user plane function UPF of the user plane system, and the MP protocol response and notification are transmitted from the HAG toward the UPF of the user plane system.

4. The method of claim 3, wherein the MP protocol request is transmitted from the HAG toward the Internet server through a Data Network (DN) and the protocol response is received at the HAG from the Internet server through the DN.

5. The method of claim 1, wherein the method further comprises transmitting, from the HAG toward the VNF-M a request to deploy a new HAG.

6. The method of claim 1, wherein the MP protocol request is a Multi-Path Transmission Control Protocol (MPTCP) request and the SP protocol request is a Transmission Control Protocol (TCP) request.

7. A method for communicating a hybrid user equipment (HUE) with an Internet server through a hybrid access gateway (HAG), the HAG being enabled to determine whether the HUE accesses through a mobile or a fixed access network, the method executed at a user plane system and comprising:
   receiving, at a user plane function (UPF) in the user plane system, a multi-path (MP) protocol request originated from a HUE, the UPF detecting the MP request using Deep Packet Inspection (DPI) capabilities, the detection being based on an existence of an MP-CAPABLE option subtype in MP-Transmission Control Protocol (TCP) options;
   initiating an MP session for the MP protocol request;
   transmitting, toward a HAG, the MP protocol request;
   receiving, from the HAG, an MP protocol response and a notification for the MP protocol request;
   if the notification notifies of requiring a proxy function, marking the MP session as proxying further MP protocol requests for the MP session toward the HAG;
   if the notification notifies of not requiring a proxy function, marking the MP session as bypassing the HAG when transmitting further MP protocol requests for the MP session toward the Internet server;
   receiving, from the user plane system, a further MP protocol request originated from the HUE for the same MP session;
   transforming the further MP protocol request into one or more SP protocol requests;
   transmitting, toward the Internet server, the one or more SP protocol requests, the HAG checking a configured network operator policy and deciding if a downlink MP request addresses a destination through an access network indicated by the policy and, if the network operator policy indicates a different access network than addressed by the downlink MP request, the HAG transmitting the downlink MP request to the HUE using a proper downlink MP request sub-flow through a different access network; and the HAG acting as a service function in a Service Function Chaining (SFC) architecture and deployed using a Virtual Network Function Manager (VNF-M) and a Virtual Infrastructure Manager (VIM), the MP protocol request and the protocol response received at the HAG from a SFC forwarder of the user plane system.

8. The method of claim 7, wherein the method further comprises:
receiving a further MP protocol request originated from the HUE for the same MP session;
if the MP session is marked as proxying, transmitting the further MP protocol request toward the HAG; and
if the MP session is marked as bypassing the HAG, transmitting the further MP protocol request toward the Internet server.

9. The method of claim 7, wherein the user plane system comprises a SFC forwarder for transmitting the MP protocol request originated from the HUE toward the HAG, and for receiving the MP protocol response and the notification from the HAG.

10. The method of claim 9, wherein the method further comprises transmitting, from the SFC forwarder to an SFC controller, a request to deploy a HAG;
transmitting, from the SFC controller toward the VNF-M a request to deploy the HAG; and
receiving, at the SFC controller from the VNF-M, a notification of the HAG deployment.

11. The method of claim 9, wherein the user plane system comprises a SFC classifier for tagging the MP protocol request originated from the HUE, and wherein the MP protocol request transmitted to the HAG, via the SFC forwarder, is a tagged MP protocol request.

12. The method of claim 7, wherein the method further comprises:
receiving, at an SFC controller from the VNF-M a notification of a new HAG deployment; and
transmitting, from the SFC controller to the SFC forwarder, new rules to maintain existing MP sessions with the HAG, and to distribute new MP sessions between the HAG and the new HAG.

13. The method of claim 7, wherein the method further comprises:
receiving, at an SFC controller, an indication of a new IP address of the HUE to be associated with the MP session; and
transmitting, from the SFC controller to the SFC forwarder, new rules to transmit MP protocol requests from the new IP address toward the HAG handling the MP session.

14. The method of claim 7, wherein the MP protocol request is transmitted toward the HAG from a user plane function UPF of a user plane system 2, and the MP protocol response and notification are received, from the HAG, at the UPF of the user plane system.

15. The method of claim 14, wherein the method further comprises transmitting, from the UPF toward the VNF-M a request to deploy a HAG; and receiving, at the UPF from the VNF-M, a notification of the HAG deployment.

16. The method of claim 14, wherein the method further comprises:
receiving, at the UPF from the VNF-M a notification of a new HAG deployment; maintaining, at the UPF, existing MP sessions with the HAG; and
distributing, at the UPF, new MP sessions between the HAG and the new HAG.

17. A hybrid access gateway (HAG) for communicating a hybrid user equipment (HUE) with an Internet server through the HAG, the HAG being enabled to determine whether the HUE accesses through a mobile or a fixed access network, the HAG configured to:
receive, via a receiver from a user plane function (UPF) in a user plane system, a multi-path (MP) protocol request originated from a HUE, the UPF detecting the MP request using Deep Packet Inspection (DPI) capabilities, the detection being based on an existence of an MP-CAPABLE option subtype in MP-Transmission Control Protocol (TCP) options;
initiate an MP session for the MP protocol request;
transmit, via a transmitter toward an Internet server, the MP protocol request;
receive, via the receiver from the Internet server, a protocol response;
if the protocol response is a single-path (SP) protocol response:
activate a proxy function for the MP session; and
transmit, via the transmitter toward the user plane system, an MP protocol response corresponding to the received SP protocol response and a notification of requiring a proxy function;
if the protocol response is an MP protocol response:
deactivate a proxy function for the MP session; and
transmit, via the transmitter toward the user plane system, the received MP protocol response and a notification of not requiring a proxy function;
receive, from the user plane system, a further MP protocol request originated from the HUE for the same MP session;
transform the further MP protocol request into one or more SP protocol requests;
transmit, toward the Internet server, the one or more SP protocol requests, the HAG checking a configured network operator policy and deciding if a downlink MP request addresses a destination through an access network indicated by the policy and, if the network operator policy indicates a different access network than addressed by the downlink MP request, the HAG transmitting the downlink MP request to the HUE using a proper downlink MP request sub-flow through a different access network; and
the HAG acting as a service function in a Service Function Chaining (SFC) architecture and deployed using a Virtual Network Function Manager (VNF-M) and a Virtual Infrastructure Manager (VIM), the MP protocol request and the protocol response received at the HAG from a SFC forwarder of the user plane system.

18. A user plane system for communicating a hybrid user equipment (HUE) with an Internet server through a hybrid access gateway (HAG), the HAG being enabled to determine whether the HUE accesses through a mobile or a fixed access network, the user plane system configured to:
receive, at a user plane function (UPF) in the user plane system, via a receiver, a multi-path (MP) protocol request originated from a HUE, the UPF detecting the MP request using Deep Packet Inspection (DPI) capabilities, the detection being based on an existence of an MP-CAPABLE option subtype in MP-Transmission Control Protocol (TCP) options;
initiate an MP session for the MP protocol request;
transmit, via a transmitter toward a HAG, the MP protocol request;
receive, via the receiver from the HAG, an MP protocol response and a notification for the MP protocol request;

if the notification notifies of requiring a proxy function, mark the MP session as proxying further MP protocol requests for the MP session toward the HAG;

if the notification notifies of not requiring a proxy function, mark the MP session as bypassing the HAG when transmitting further MP protocol requests for the MP session toward the Internet server;

receive, from the user plane system, a further MP protocol request originated from the HUE for the same MP session;

transform the further MP protocol request into one or more SP protocol requests;

transmit, toward the Internet server, the one or more SP protocol requests, the HAG checking a configured network operator policy and deciding if a downlink MP request addresses a destination through an access network indicated by the policy and, if the network operator policy indicates a different access network than addressed by the downlink MP request, the HAG transmitting the downlink MP request to the HUE using a proper downlink MP request sub-flow through a different access network; and the HAG acting as a service function in a Service Function Chaining (SFC) architecture and deployed using a Virtual Network Function Manager (VNF-M) and a Virtual Infrastructure Manager (VIM), the MP protocol request and the protocol response received at the HAG from a SFC forwarder of the user plane system.

* * * * *